Nov. 18, 1958     I. O. MOBERG     2,860,664
METHOD OF AND APPARATUS FOR WEAVING HIGH AND LOW PILE FABRICS
Filed Dec. 15, 1953     15 Sheets-Sheet 1
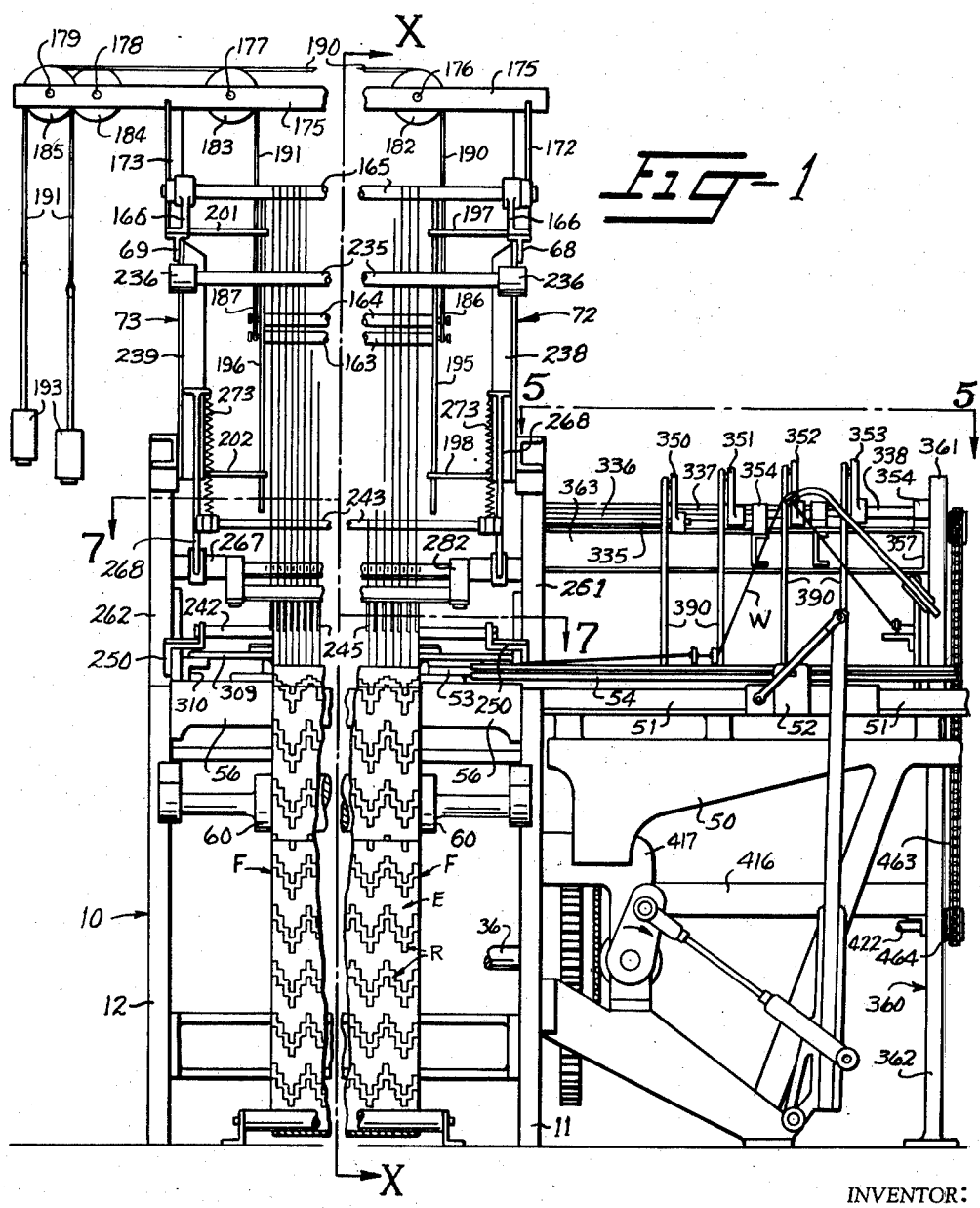
INVENTOR:
IVAR O. MOBERG.
BY Eaton & Bell
ATTORNEYS.

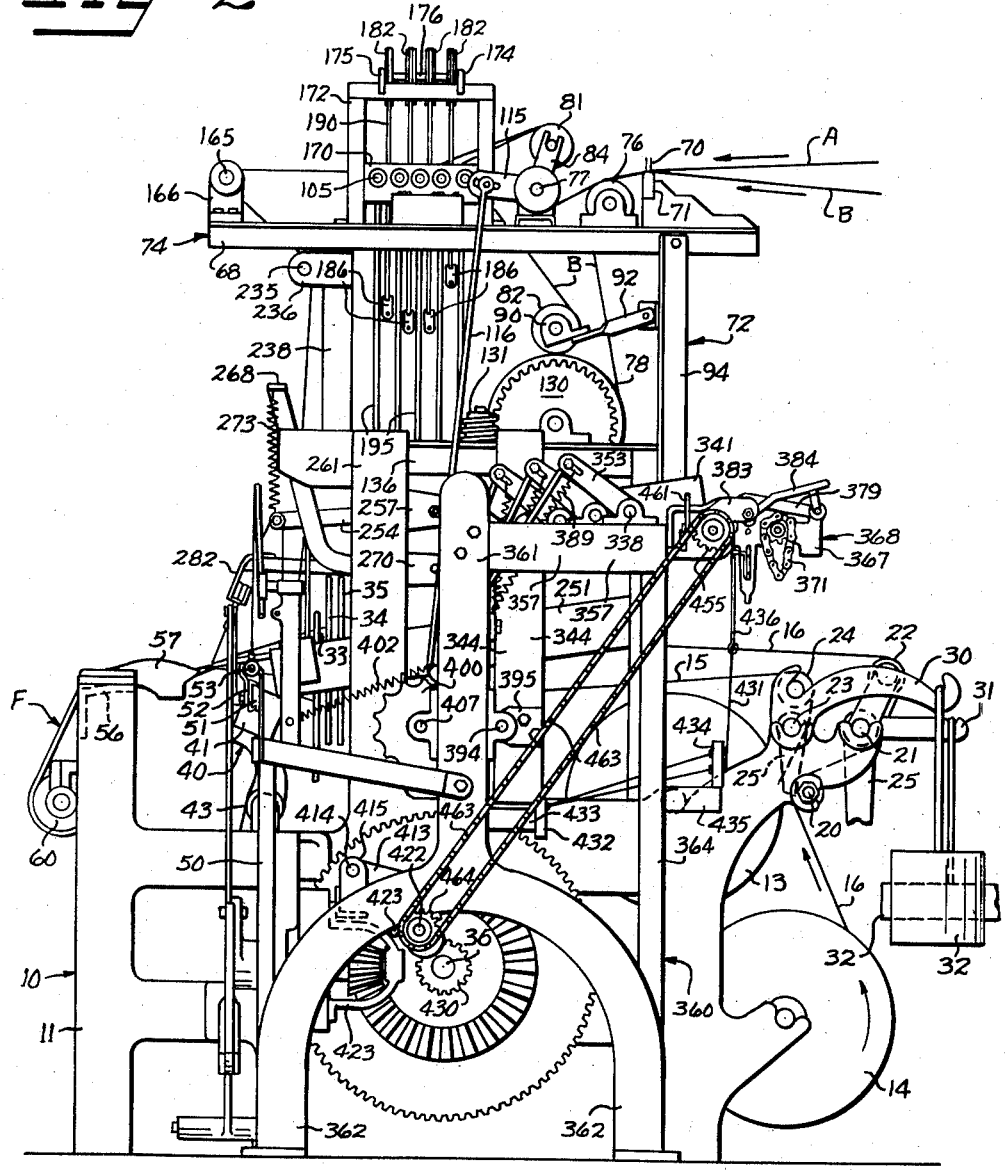

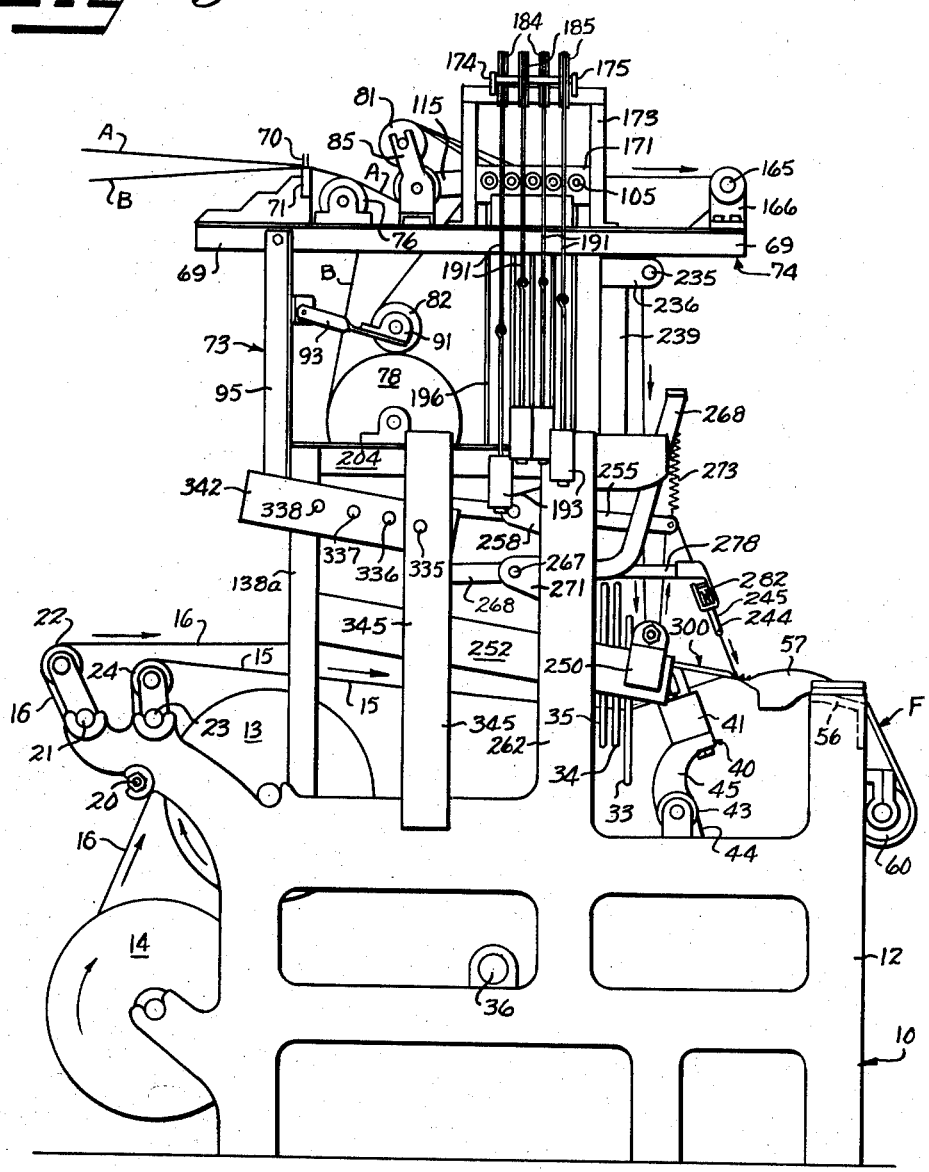

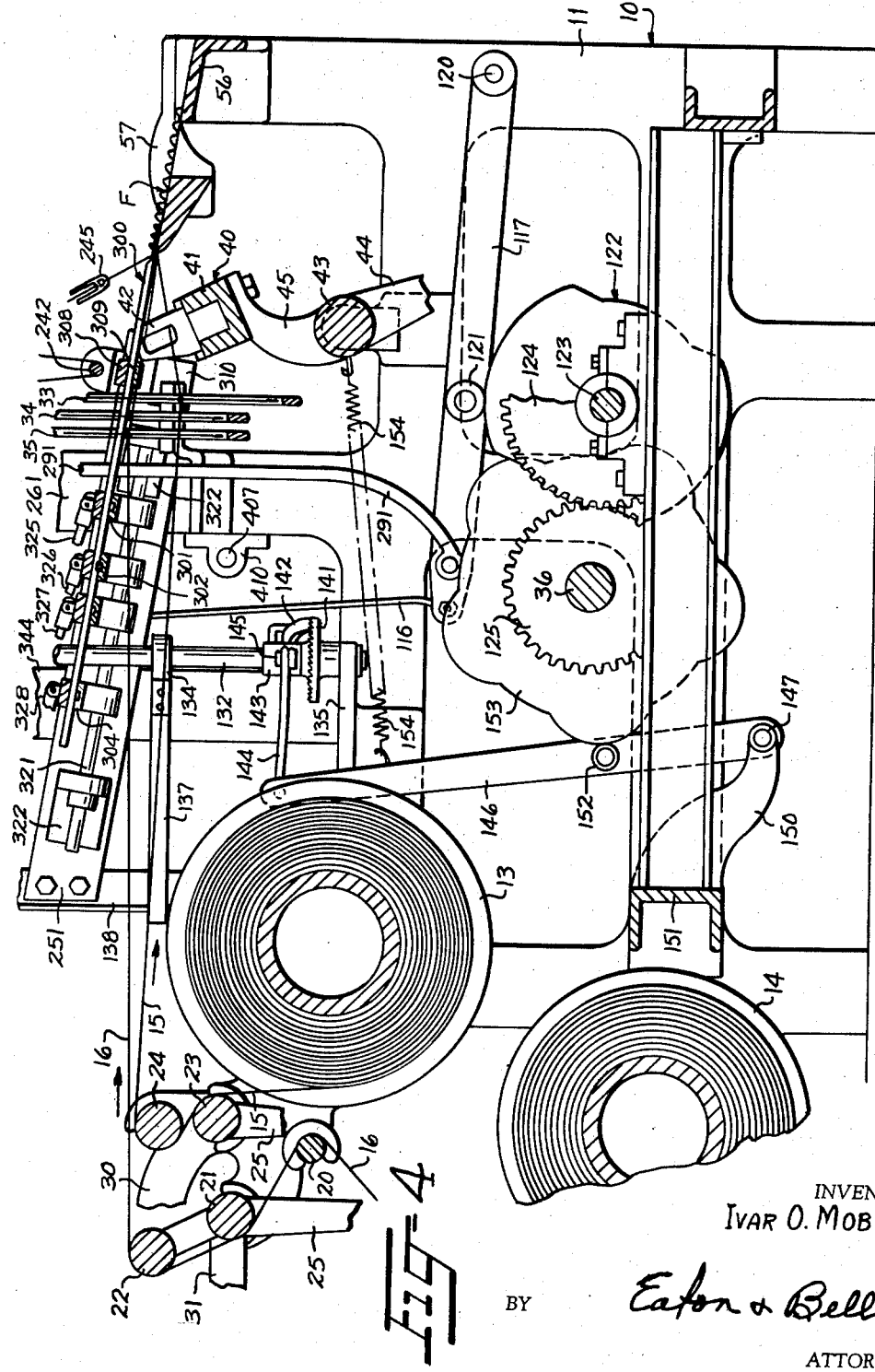

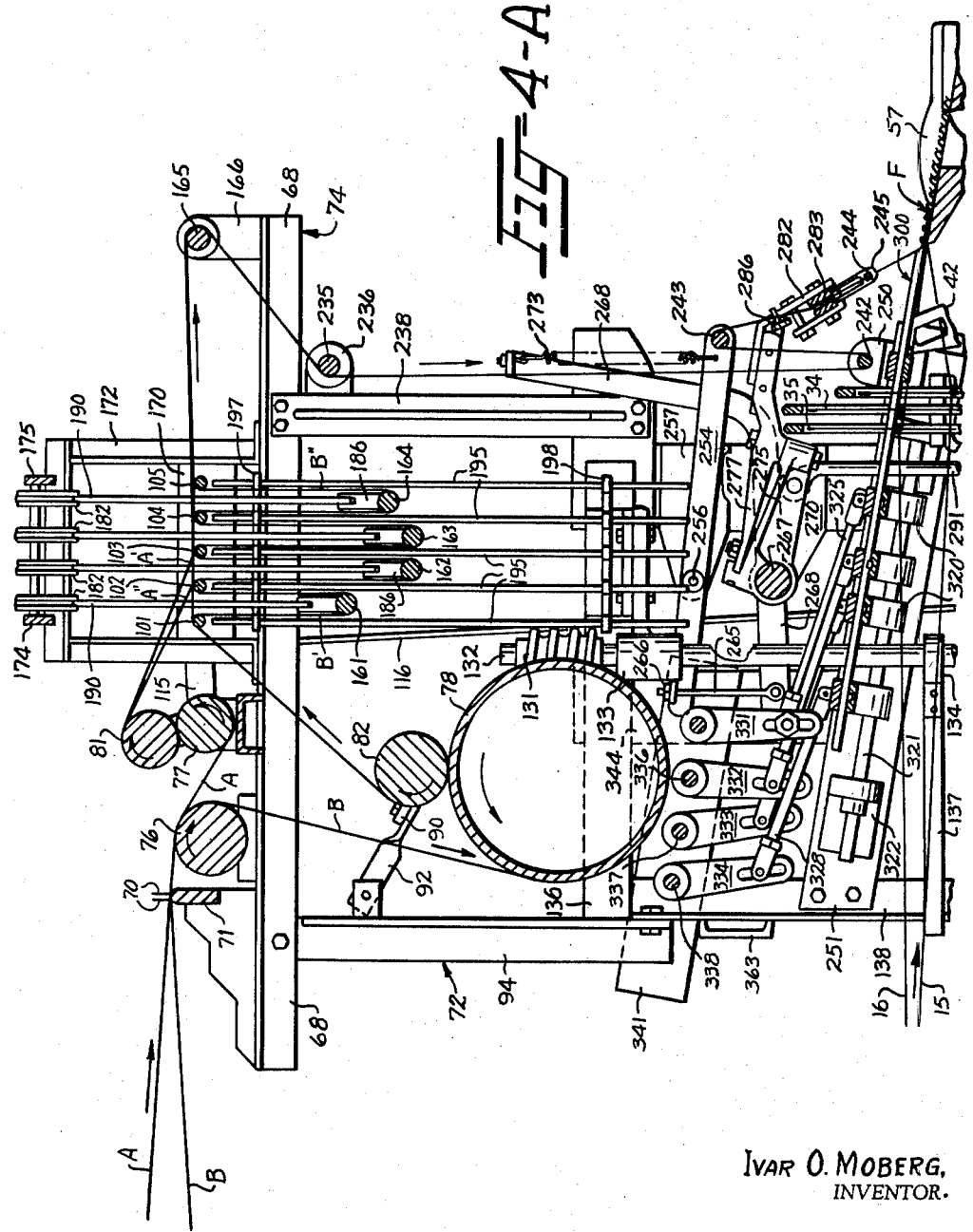

Nov. 18, 1958 I. O. MOBERG 2,860,664
METHOD OF AND APPARATUS FOR WEAVING HIGH AND LOW PILE FABRICS
Filed Dec. 15, 1953 15 Sheets-Sheet 6
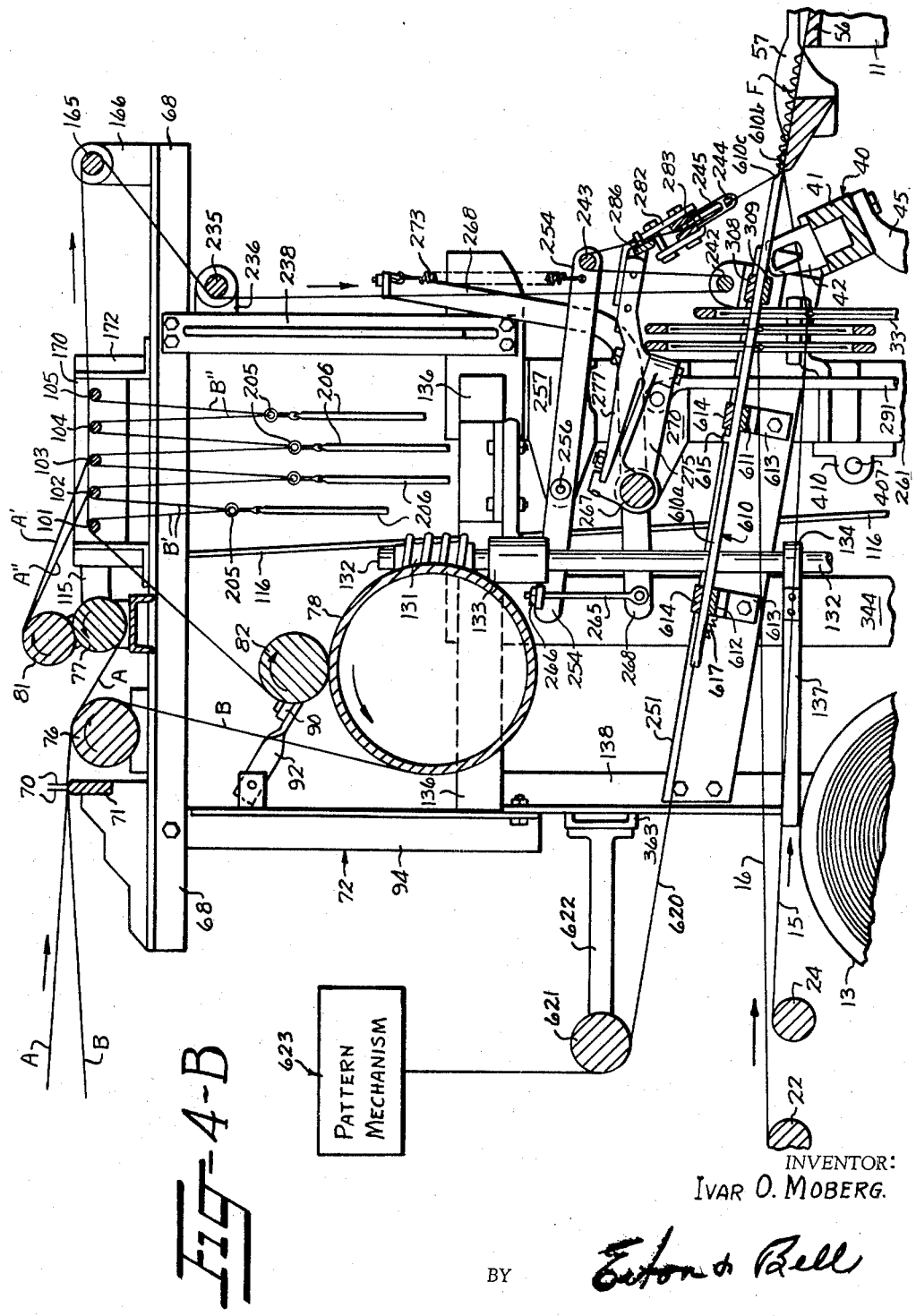
INVENTOR:
IVAR O. MOBERG.
BY
ATTORNEYS.

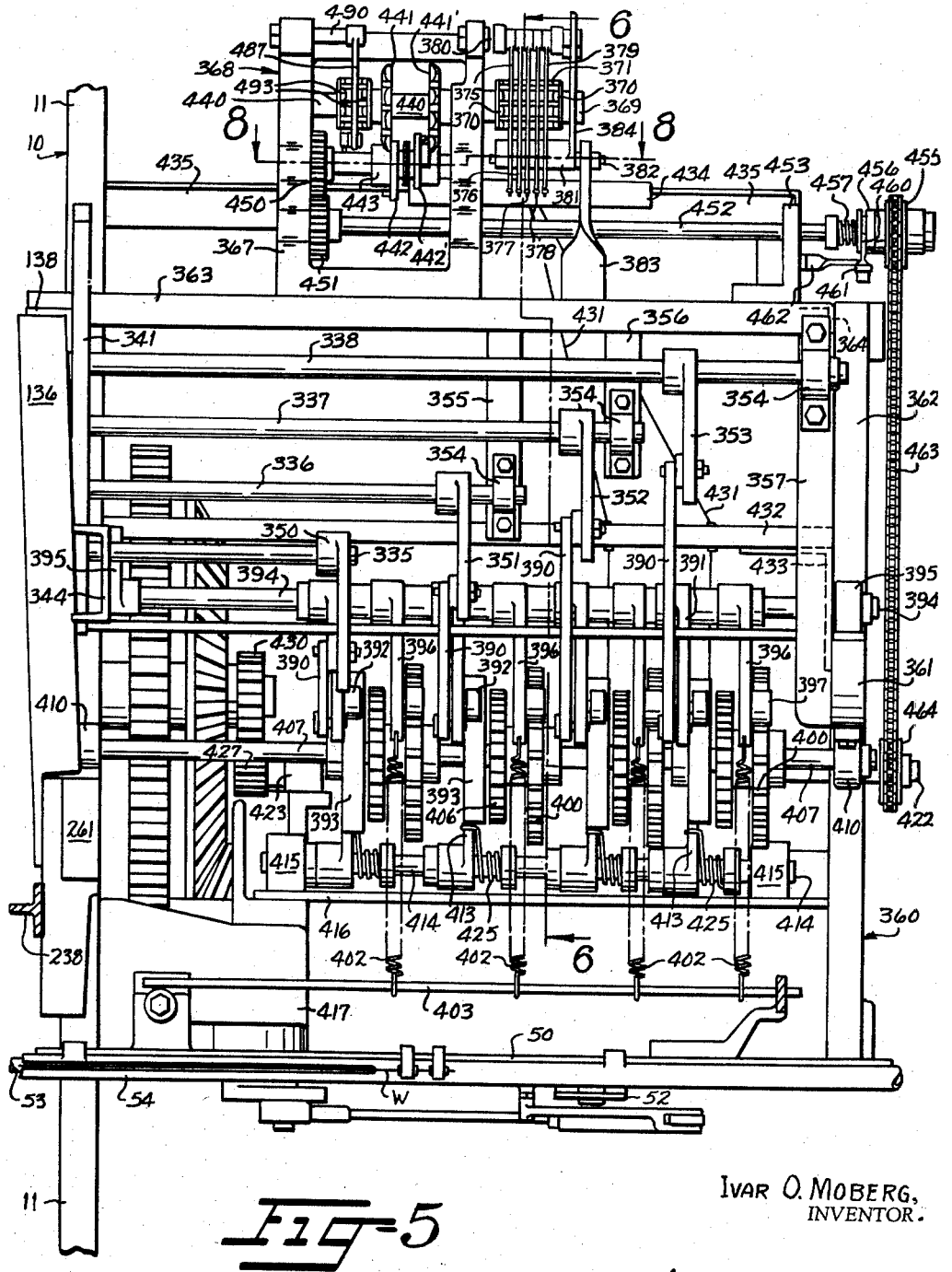

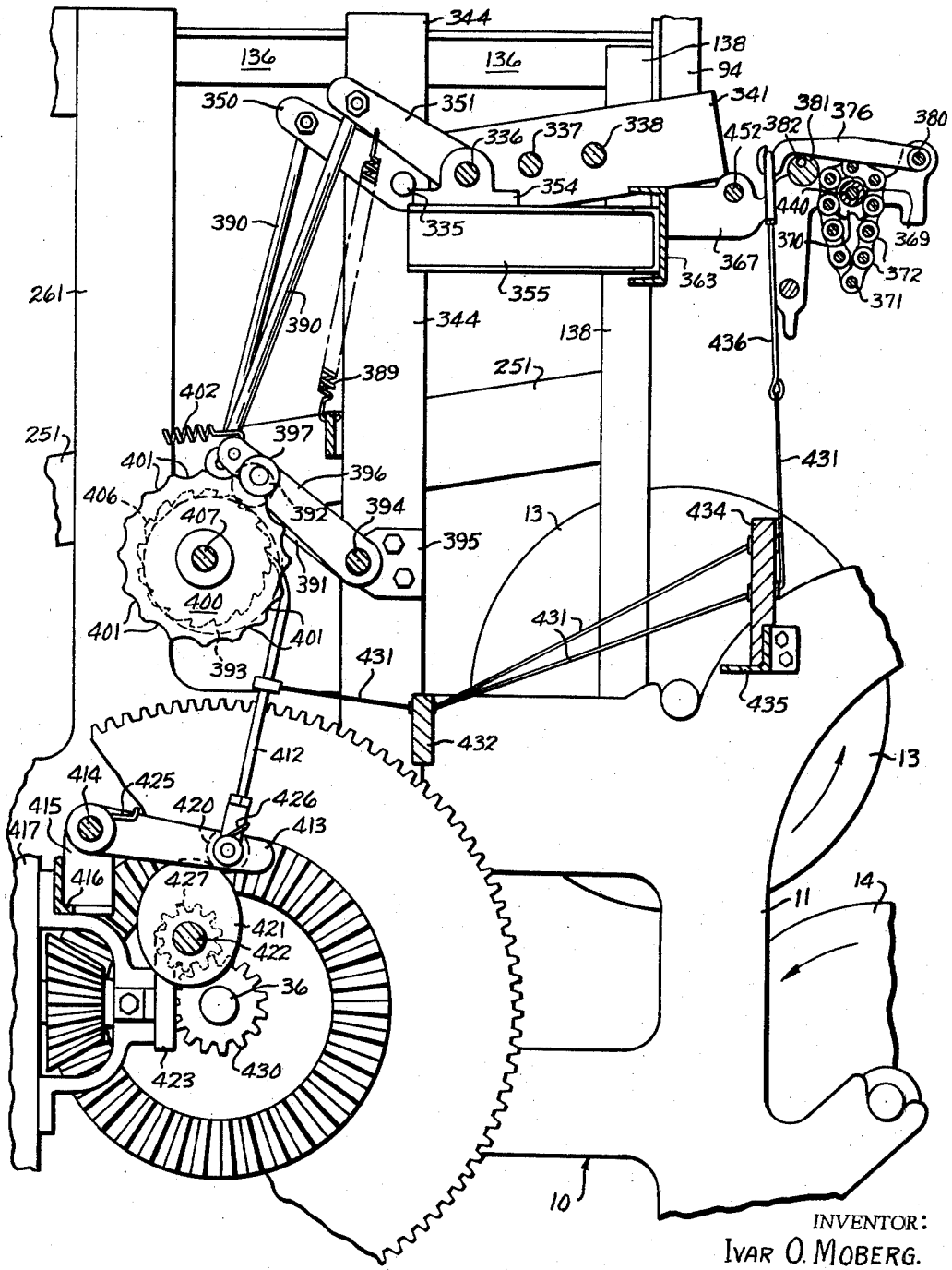

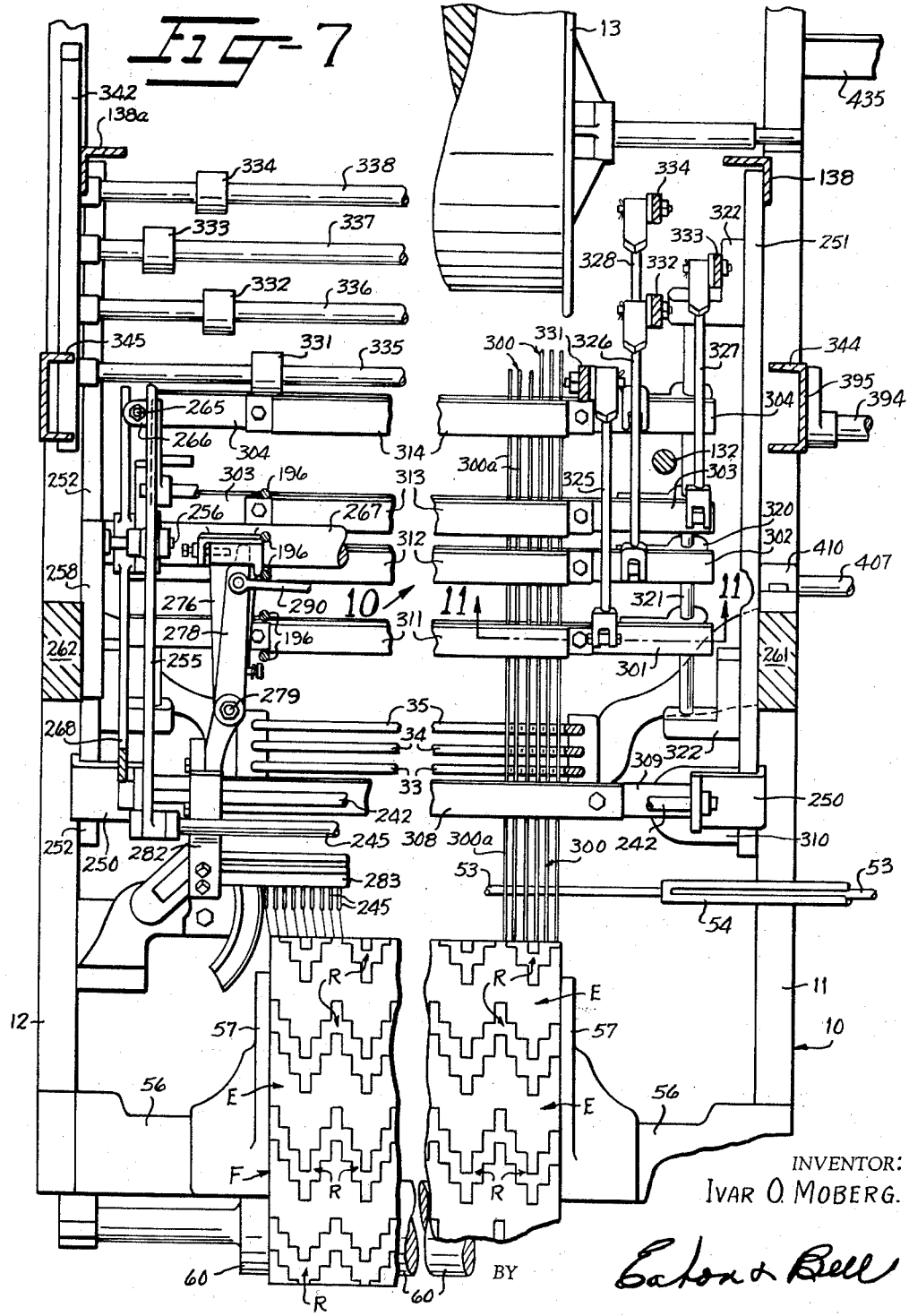

Nov. 18, 1958            I. O. MOBERG            2,860,664
METHOD OF AND APPARATUS FOR WEAVING HIGH AND LOW PILE FABRICS
Filed Dec. 15, 1953            15 Sheets—Sheet 10
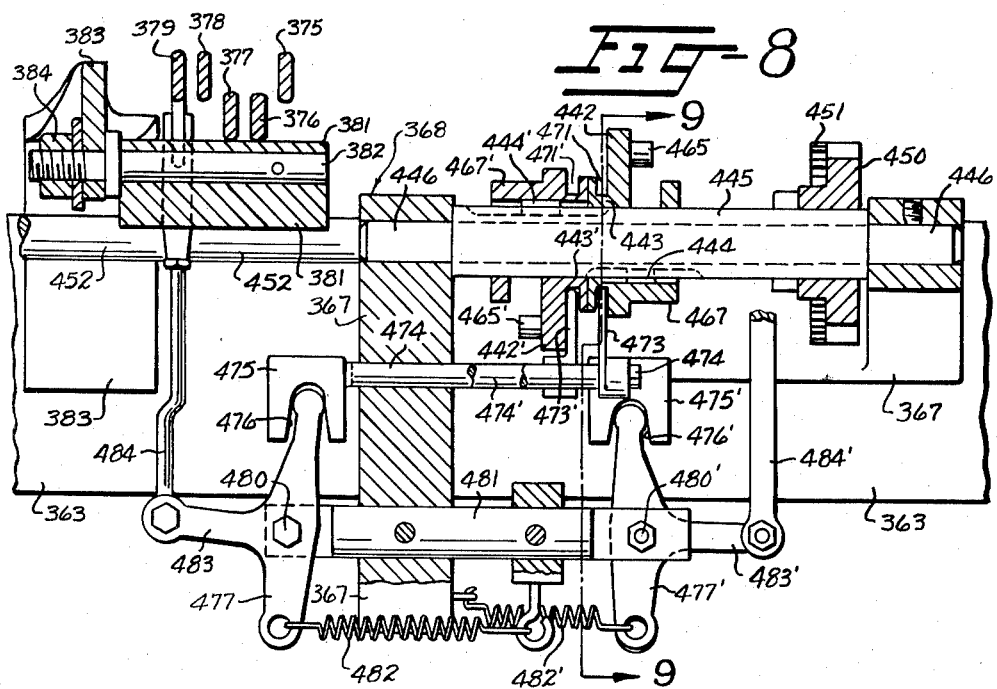
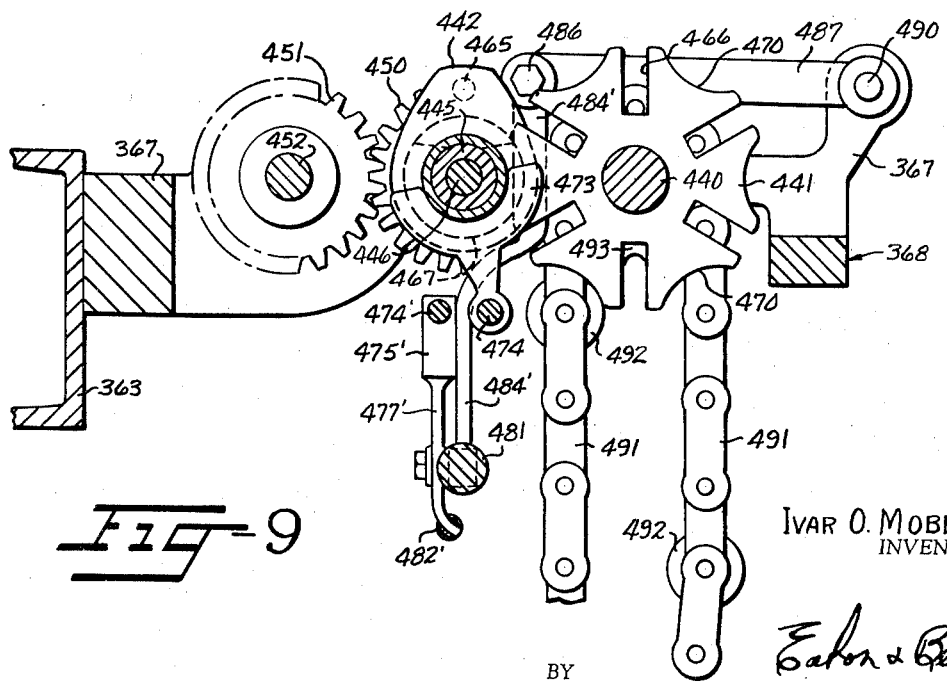
IVAR O. MOBERG,
INVENTOR.
BY Eaton & Bell
ATTORNEYS.

Nov. 18, 1958     I. O. MOBERG     2,860,664
METHOD OF AND APPARATUS FOR WEAVING HIGH AND LOW PILE FABRICS
Filed Dec. 15, 1953     15 Sheets-Sheet 11
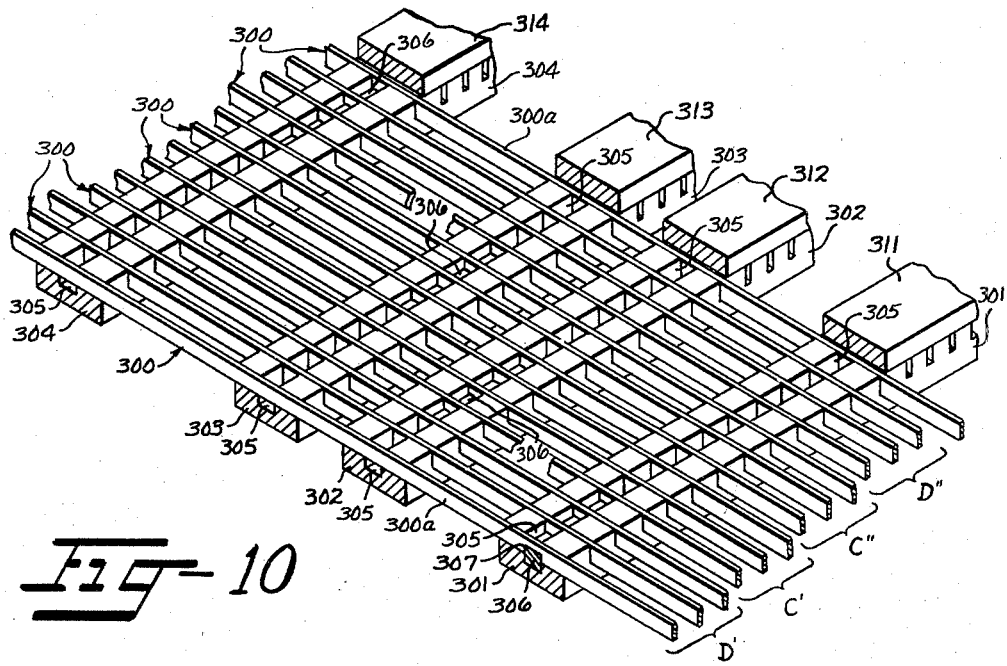
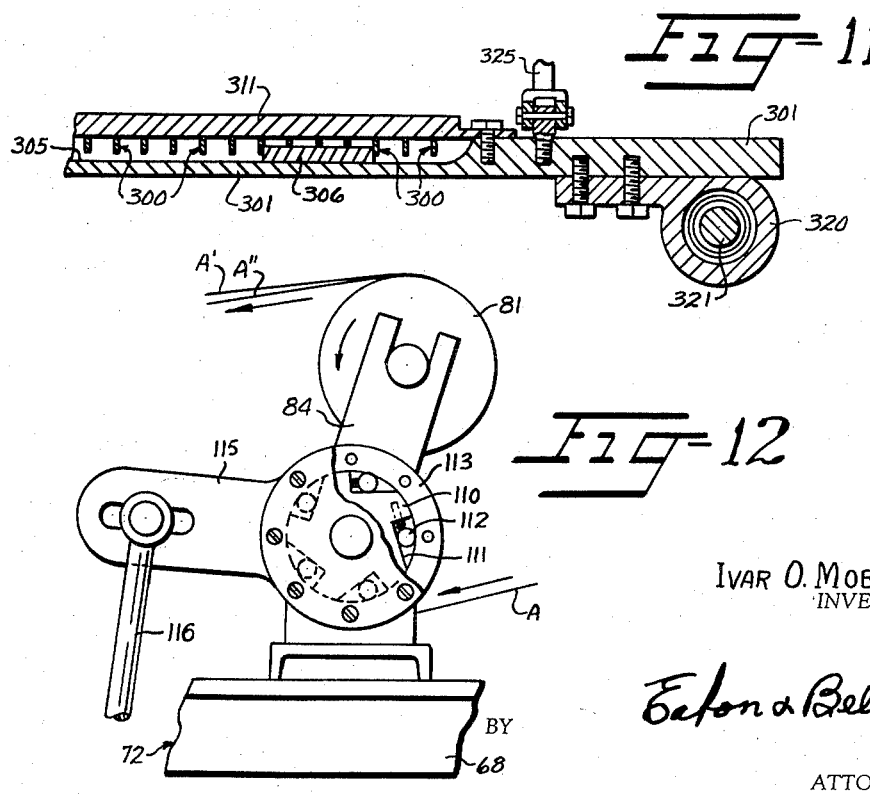
IVAR O. MOBERG,
INVENTOR.
BY Eaton & Bell
ATTORNEYS.

Nov. 18, 1958     I. O. MOBERG     2,860,664
METHOD OF AND APPARATUS FOR WEAVING HIGH AND LOW PILE FABRICS
Filed Dec. 15, 1953     15 Sheets-Sheet 12
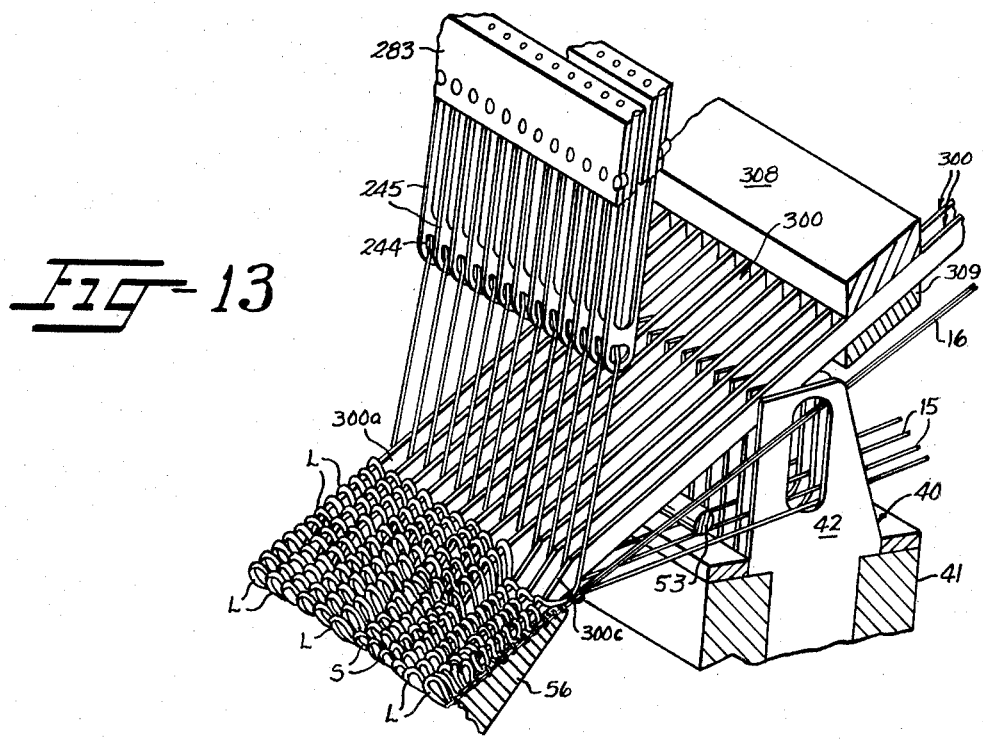
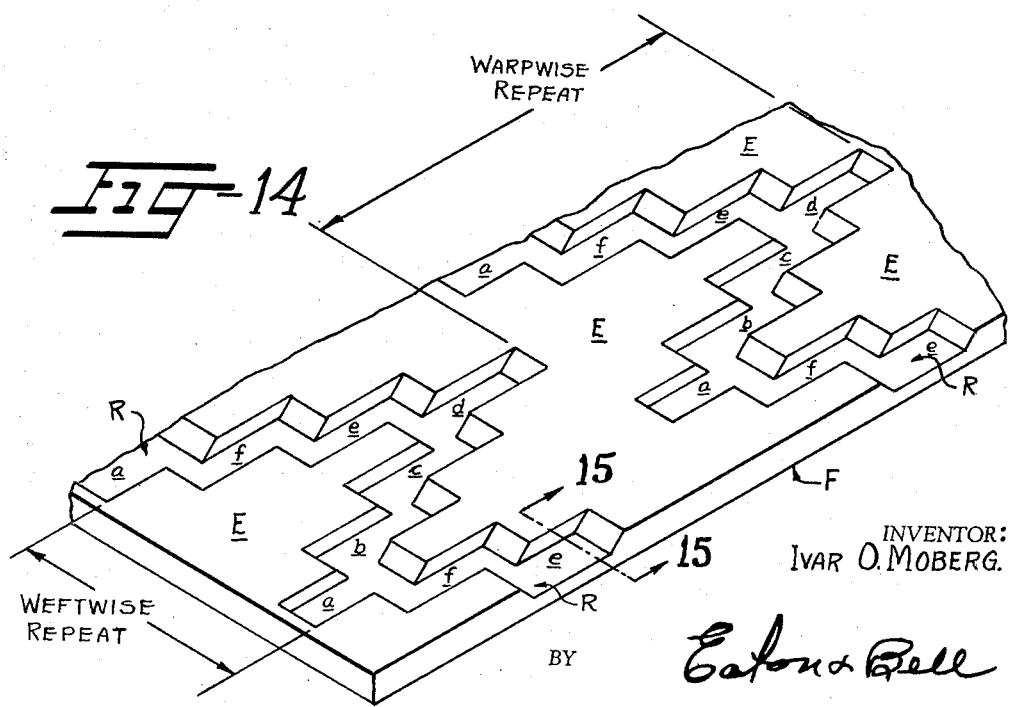
INVENTOR:
IVAR O. MOBERG.
BY
ATTORNEYS.

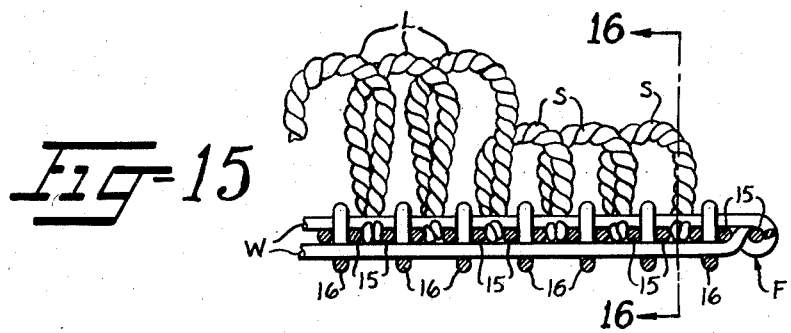
FIG-15
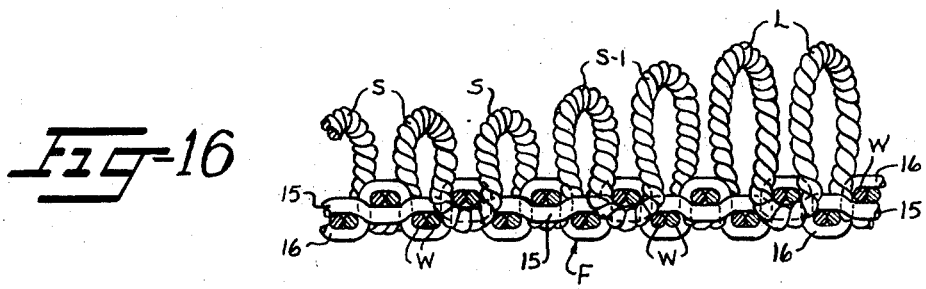
FIG-16
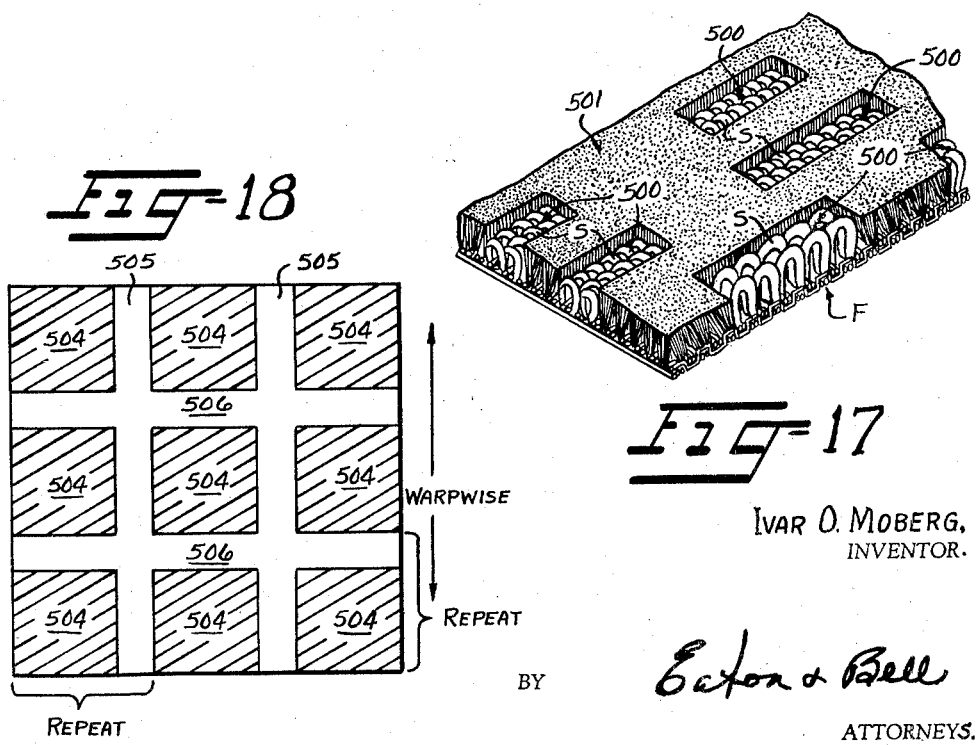
FIG-18
FIG-17
IVAR O. MOBERG,
INVENTOR.
BY Eaton & Bell
ATTORNEYS.

Nov. 18, 1958     I. O. MOBERG     2,860,664
METHOD OF AND APPARATUS FOR WEAVING HIGH AND LOW PILE FABRICS
Filed Dec. 15, 1953     15 Sheets-Sheet 14

IVAR O. MOBERG,
INVENTOR.

BY Eaton & Bell

ATTORNEYS.

Nov. 18, 1958     I. O. MOBERG     2,860,664
METHOD OF AND APPARATUS FOR WEAVING HIGH AND LOW PILE FABRICS
Filed Dec. 15, 1953     15 Sheets-Sheet 15
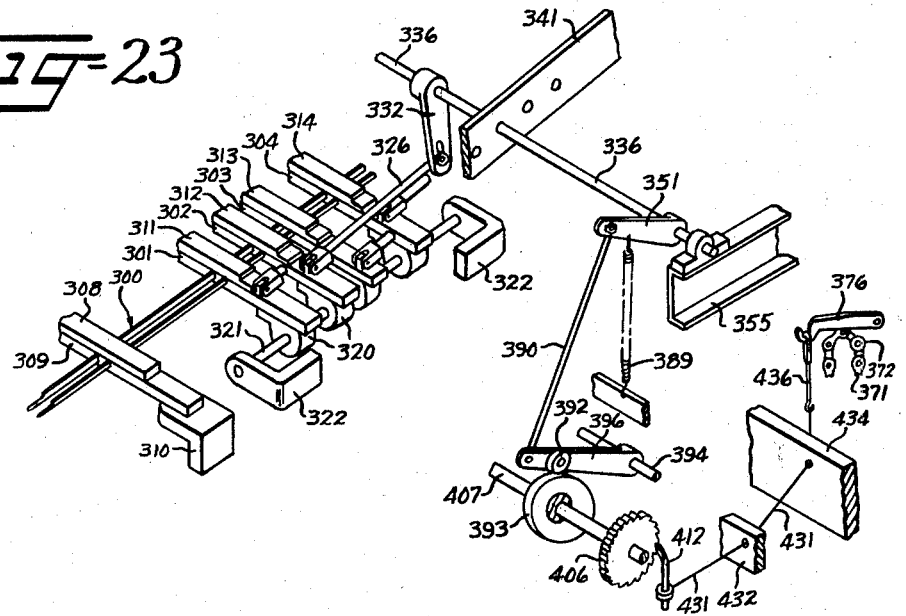
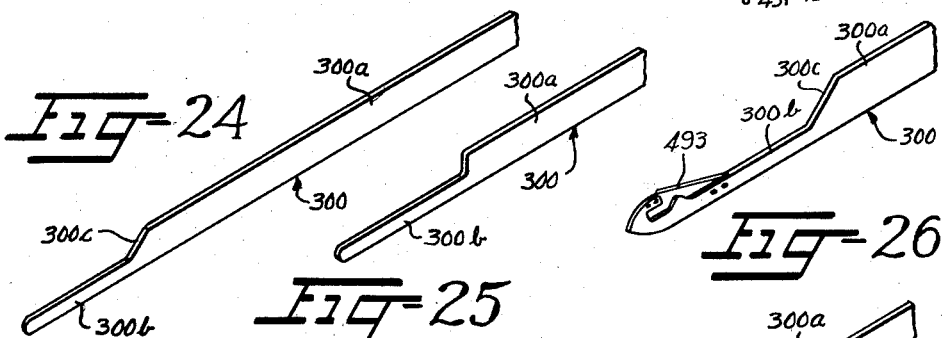
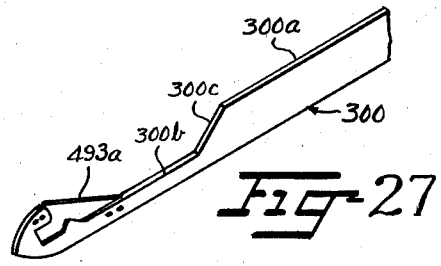
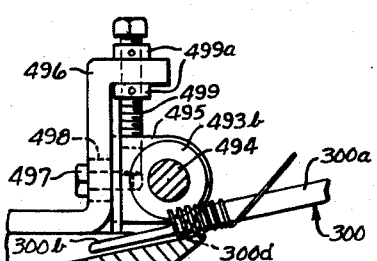
IVAR O. MOBERG,
INVENTOR.
BY *Eaton & Bell*
ATTORNEYS.

United States Patent Office 2,860,664
Patented Nov. 18, 1958

2,860,664

METHOD OF AND APPARATUS FOR WEAVING HIGH AND LOW PILE FABRICS

Ivar O. Moberg, Spray, N. C., assignor, by mesne assignments, to The New York Trust Company, a corporation of New York, and John H. Baile, Saddle River, N. J., as trustees Application December 15, 1953, Serial No. 398,287

46 Claims. (Cl. 139—46)

This invention generally relates to looms and, more especially to an improved fabric structure and method of and apparatus for weaving pile fabrics such as rugs, carpets and the like. It is further contemplated that the principles of the present invention may also be applied in the manufacture of terry cloth for use in making bath mats, towels, and the like. It can also be used for making cloth of various kinds.

It is the primary object of this invention to provide apparatus incorporated in a loom for the weaving of loop and/or cut pile into a base or ground fabric and having means to carry out the method of forming pile from continuous strands of yarn, taken from a beam or beams, spools, banks or creels and woven into the base fabric initially in the form of pile loops and wherein the pile loops are formed of varying length according to a preconceived pattern. For example, the major portion of the fabric may be formed with relatively long pile loops with variantly-shaped design areas being formed from relatively short pile loops, or vice versa, so the areas formed with the relatively long loops appear to be embossed over the recessed areas formed with the relatively short loops. A pleasing and extremely ornamental appearance is further obtained by severing the raised or relatively long or high pile loops so the raised areas have a frieze appearance and the recessed areas have a solid looped appearance.

There are various types of looms currently in use which are provided with means for forming pile loops from continuous strands of yarn in a base or ground fabric, in some of which fingers, wires or guides extending warpwise of the loom are used in combination with doup heddles or harnesses. In other types of looms, for weaving relatively heavy fabrics, such as carpets, rugs and the like, wires or guides extending weftwise of the loom have been employed for forming pile loops. In another type of loom, spaced warpwise extending fingers, gauges or wires mounted in front of the harnesses and independent in operation therefrom, have been provided, over which strands of pile yarn are woven into loops anchored in the base or ground fabric and the loops thus formed are moved along the loop forming fingers by the beating-up action of the loom and over the free ends of the fingers, as disclosed in various patents, such as Patents Nos. 2,437,378 and 2,437,379 issued to Eugene F. Clark on March 9, 1948.

The present invention is particularly concerned with improvements in apparatus of the character disclosed in said patents; wherein a plurality of spaced warpwise extending loop forming fingers are employed. It is another object of this invention, however, to provide such loop forming fingers with stepped free end portions of varying height with pattern controlled means for shifting selected fingers lengthwise of the warp and relative to the reed in accordance with a desired pattern so that successive groups of loops formed over the free ends of each of said loop forming fingers may be of varying height or length in accordance with the height of the particular stepped portion of the corresponding finger or fingers over which the loops are formed.

It is still another object of this invention to provide, in combination with an apparatus of the character last described, pile yarn tensioning means for compensating for the variations in the amount of pile yarn drawn over the free ends of adjacent loop forming fingers, since it is apparent that a substantially lesser length of pile yarn is required in forming each relatively short or low loop as compared to the length of pile yarn required in forming each relatively high or long loop.

Another and further object of this invention is the provision of a method of weaving on a loom, wherein a series of loop forming fingers having operating surfaces thereon of varying height are employed, which comprises weaving a ground or base fabric from ground warp yarns and weft yarns while threading pile yarns under tension over said fingers and into the warp on each side of successive groups of warp yarns, inserting weft yarn through the loops of pile formed on the fingers, drawing the strands of pile yarn snugly over the fingers and selectively varying the position of the fingers warpwise of the loom to thereby vary the height of the portions of the fingers over which the strands of pile yarns are drawn to consequently vary the height of successive groups of pile loops formed by being drawn over the shifted loop forming fingers.

Some of the objects of the invention having been stated, other objects will appear as the description proceeds, when taken in connection with the accompanying drawings, in which—

Figure 1 is a somewhat schematic front elevation of a loom, with many of the parts which are not pertinent to the present invention being omitted, and showing many of the parts of the present invention in association therewith;

Figure 2 is a side elevation of the loom looking at the right-hand side of Figure 1, but showing the improved pile loop forming instrumentalities thereof more in detail than they are shown in Figure 1;

Figure 3 is a left-hand side elevation of the loom looking at the left-hand side of Figure 1 or the opposite side of the loom from that shown in Figure 2 and also showing the loop forming instrumentalities more in detail than they are shown in Figure 1;

Figure 19:
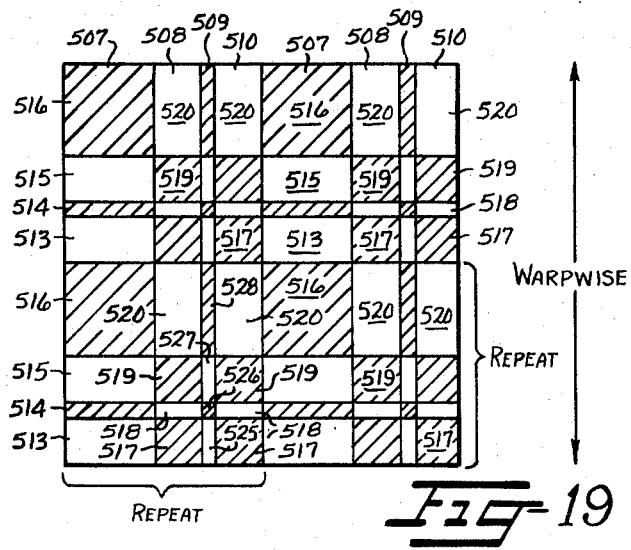

Figures 4 and 4-A collectively represent an enlarged longitudinal vertical sectional view through the loom taken substantially along the line X—X in Figure 1, but wherein the upper portion of Figure 4 includes many of the parts shown in the lower portion of Figure 4-A for purposes of clarity;

Figure 4-B is a view similar to Figure 4-A, but showing modified forms of pile yarn tension compensating means and pattern control means for the loop forming fingers;

Figure 5 is an enlarged fragmentary plan view taken substantially along the line 5—5 in Figure 1 and showing, in particular, the first form of pattern mechanism for controlling the longitudinal shifting of selected loop forming fingers;

Figure 6 is a fragmentary vertical sectional view, mostly in elevation, taken substantially along line 6—6 in Figure 5;

Figure 7 is an enlarged fragmentary plan view taken substantially along line 7—7 in Figure 1, with many of the parts broken away and other parts being shown in section for purposes of clarity;

Figure 8 is an enlarged vertical sectional view through portions of the first form of pattern mechanism taken looking down substantially along line 8—8 in Figure 5;

Figure 9 is a fragmentary detail, partly in section, taken substantially along line 9—9 in Figure 8;

Figure 10 is an enlarged isometric view showing the manner in which the improved loop forming fingers of the first form of the invention are anchored to certain longitudinally shiftable bars for imparting longitudinal shifting movement to certain of the loop forming fingers independently of the others and looking substantially in the direction of the arrow indicated at 10 in Figure 7;

Figure 11 is an enlarged fragmentary substantially vertical sectional view taken substantially along line 11—11 in Figure 7 and also showing the manner in which certain of the loop forming fingers are caused to shift in unison with a corresponding finger holding and guiding bar while adjacent fingers are permitted to remain stationary or move independently thereof;

Figure 12 is an enlarged fragmentary detail of parts of the let-off mechanism for one of the sets or sheets of pile yarns, this view being an enlarged detail of the structure shown in the uppermost central portion of Figure 2, with parts broken away for purposes of clarity;

Figure 13 is an enlarged fragmentary detail, in perspective, showing the relationship between some of the loop forming fingers while forming relatively short loops and others of the loop forming fingers while forming relatively long loops and also showing the reed or beating-up means and the vertically and laterally shiftable pile yarn guide means which function to loop the pile yarns over the corresponding loop forming fingers;

Figure 14 is a schematic illustration showing adjacent recessed and embossed areas respectively formed from relatively short and relatively long loops, but wherein said areas are shown schematically in block form to clarify the relative shape or configuration of adjacent areas;

Figure 15 is an enlarged fragmentary weftwise view through the fabric taken substantially along line 15—15 in Figure 14, and showing adjacent long-loop and short-loop areas;

Figure 16 is a fragmentary warpwise view of the fabric at the juncture of adjacent long-loop and short-loop areas, taken substantially along line 16—16 in Figure 15;

Figure 17 is an isometric view of a piece of fabric woven according to the practices of the present invention, but wherein the long loops have been severed to produce a tufted, cut pile or frieze effect between adjacent short-loop areas;

Figures 18 through 22 are schematic illustrations of a few of many different types of loop patterns which may be produced in accordance with the principles of the present invention;

Figure 23 is a schematic isometric view showing the mechanical connections between one form of pattern mechanism and one of the finger holding and guiding bars to which one of the series of fingers is attached;

Figure 24 is a detailed isometric view of the operating end of one form of loop forming finger, such as that shown in Figure 13;

Figure 25 is a fragmentary isometric view similar to Figure 24, but showing the operating end of another form of loop forming finger wherein the inclined portion is omitted between the shank and nose portion of the finger;

Figure 26 is a fragmentary view similar to Figure 24, but showing a relatively short blade fixed to the free end of the nose portion of the loop forming finger for severing only the relatively short loops formed over the nose portion of the finger;

Figure 27 is a view similar to Figure 26, but showing a relatively long or high blade thereon for severing both the relatively long and relatively short loops formed over the shank and the nose portion, respectively, of the corresponding finger;

Figure 28 is a fragmentary detail showing one of the loop forming fingers in the position occupied thereby during the forming of relatively long loops and showing another form of loop severing means in association therewith for severing only the long loops formed on the shanks of the corresponding loop forming fingers.

Referring more specifically to the drawings, many of the parts of the loom are conventional and many of the parts of the improved mechanism incorporated in the loom for the weaving of pile into the base fabric are similar to those disclosed in Clark Patents Nos. 2,437,378 and 2,437,379.

The loom includes a main frame broadly designated at 10 having side frame members 11 and 12 which, at their rear ends, support opposite ends of upper and lower ground warp beams 13, 14 from whence respective sheets of ground warp yarns 15 and 16 are withdrawn during operation of the loom. The ground warp yarns 16 pass upwardly from the beam 14 partially around a fixed roll 20, and successively pass in engagement with snap rolls 21 and 22. The ground warp yarns 15 extend upwardly from warp beam 13 and successively pass in engagement with snap rolls 23 and 24. The snap rolls 21, 22, 23 and 24 are suitably supported by the loom frame members 11 and 12 and each of the sets of snap rolls 21, 22 and 23, 24 is provided with an arm 25 connected to suitable let-off and take-up mechanisms, not shown.

Arms 30 and 31 are provided, from each of which a weight 32 is suspended, which serve to apply tension to the warp yarns 15 and 16. The warp yarns 15 and 16 pass forwardly from the respective snap rolls 24 and 22, through a set of harnesses, of which three are shown indicated at 33, 34 and 35. The harnesses 33, 34 and 35 are vertically reciprocated by conventional means, not shown, connected with a main drive shaft 36 mounted in the loom frame 10. During operation of the loom, the main drive shaft 36 is constantly driven by conventional means, not shown, to rotate, in this instance, a third of a revolution with each pick of the loom.

After the warp yarns 15, 16 have passed through the harnesses 33, 34, 35, they pass through a reed or beating-up means broadly designated at 40 and comprising a reed box or lay 41 having a plurality of closely spaced reed dents 42 mounted thereon (Figures 4 and 13) with openings therein through which the warps 15, 16 are threaded. The reed box or lay 41 is oscillated by rocker arms 45 mounted on a shaft 43 carried by the side frame members 10 and 11 of the main frame 10 in the usual manner and operated by a lever 44 connected, by proper linkage, not shown, with a cam on the drive shaft 36.

At one side of the loom (Figures 1, 2 and 5) is an upright needle track supporting frame 50 which supports a conventional needle track 51 on which a needle carriage 52 is mounted, with one end of a needle 53 being secured to the needle carriage 52 and passing through a fixed needle guide 54 mounted on the track 51 with the usual operating mechanism for passing the needle 53 weftwise of the loom for the insertion of the weft yarn W in the shed formed from the warp yarns 15 and 16, said filling yarn or weft yarn being directed to the needle 53 from a suitable source, not shown, and by conventional means substantially as shown in Figures 1 and 2. Of course, as is well known in the art, the needle 53 inserts a double filling of weft yarn between the warps each time the position of the harnesses 33, 34 and 35 is changed, or in advance of each beat-up stroke of the reed 40.

A breast beam 56 is provided transversely of the frame 10 at the front thereof (Figures 2, 3 and 4) which, in turn, supports a conventional breast plate 57 for the support of the fabric F after it has been woven. The woven fabric passes downwardly from the breast plate 57 and is taken up by a conventional take-up means including a take-up roller or sand roll 60 connected with the usual let-off and take-up mechanism of the loom, not shown, to thereby maintain the woven fabric F and the warp yarns 15 and 16 under constant predetermined tension.

The structure heretofore described is conventional and well known in the art and is provided for use in conjunction with the improved pile loop forming apparatus to be later described for weaving a ground, base or foundation fabric to which the pile loops are attached. The mechanism for operating the pile yarn guides, which serve to direct the pile yarns over the loop forming fingers, is substantially the same as that disclosed in said Clark patents and, as a matter of fact, the general fabric construction may be substantially the same as that shown in Figures 13, 14 and 15 of said Clark Patent No. 2,437,378 and Figures 11, 12 and 13 of said Clark Patent No. 2,437,389, with the exception that the present invention provides means whereby the pile loops or the cut pile formed therefrom may be of varying height or length warpwise of the fabric in accordance with a predetermined pattern.

In the present instance, the operating mechanisms for the pile yarn guides are arranged for a so-called "two-shot weave," although it is to be distinctly understood that the operating mechanisms for the pile yarn guides may be arranged for a single shot weave, a three-shot weave or any other desired type of weave.

The pile yarn let-off and tension compensating means, to be presently described, are particularly arranged for controlling the feeding of the pile yarns to the loop forming instrumentalities, also to be later described, for forming a loop pile pattern or cut pile pattern substantially of the type shown on the fabric F in Figures 1, 7 and 14 wherein it will be observed that the fabric has a plurality of warpwise spaced, transversely or weftwise extending, and recessed zig-zag lines R formed thereon from relatively short pile loops, with solid or embossed areas E being formed between adjacent transverse rows or recess design areas R and being formed from relatively long pile loops.

Referring to Figure 14, it will be noted that each weftwise repeat includes a stepped recessed area which is substantially V-shaped, the step portions in each repeat being indicated at a, b, c, d, e and f in Figure 14 only and each of said weftwise rows of recessed pile design areas being indicated at R in Figures 1, 7 and 14.

It is apparent, therefore, that there are a substantially greater number of relatively long loops formed, with each beat-up stroke of the reed 40, in weaving the portions of the fabric embraced by the recessed areas d and a, than there are relatively long loops formed, with each beat-up stroke of the reed 40, in weaving the portions of the fabric areas c, e and b, f.

Accordingly, it is necessary to let-off and take-up the slack in the pile yarn in accordance with the variations in the height or lengths of the loops formed over the loop forming fingers, to be later described, during the weaving operation. For example, it is apparent that a lesser amount of each yarn is used in forming the loops in the recessed or short-loop areas a through f (Figure 14) than is used in forming the embossed or long-loop areas between adjacent zig-zag lines R. However, when the number of high or long pile loops and the number of low or short pile loops are the same in a warpwise repeat throughout the width of the fabric being woven, the pile yarns may be taken from a single beam and let-off by a common let-off mechanism providing, in combination therewith, a pile yarn tensioning compensating mechanism or apparatus of either the type shown in the upper central portion of Figure 4-A or the type shown in the upper central portion of Figure 4-B, which pile yarn tensioning mechanisms will be later described in detail.

On the other hand, in weaving fabrics wherein the number of long loops and the number of short loops formed warpwise of the fabric is not equal in adjacent warpwise extending areas in a given warpwise repeat, it is often necessary to let-off some of the pile yarns at a faster or slower rate than others of the pile yarns.

Accordingly, although it is not particularly necessary in forming the type of loop pattern shown in Figures 1, 7 and 14, the loom is provided with two let-off mechanisms and, as shown in Figure 4-A, two sheets of pile yarns A, B are drawn from a suitable source, not shown, such as beams, spools, banks or creels, as desired.

Since the two let-off mechanisms exemplify a means for letting off some of the pile yarns at a faster rate than others of the pile yarns, if the pile yarns are to be taken from beams, it follows that it is necessary that at least two beams be used, since they will be rotated at different speeds as the respective pile yarns are withdrawn therefrom.

Referring again to Figure 4-A, it will be observed that the pile yarns A, B, are drawn from said source and passed through suitable pile yarn separators shown in the form of upright pins 70 fixed to a stationary transverse bar or pin board 71 whose opposite ends are supported on horizontal bars 68, 69 of respective spaced built-up upper side frame members 72, 73 of a superstructure or upper auxiliary frame broadly designated at 74. The lower ends of the side frame members 72, 73 are suitably secured to the conventional loom side frame members 11 and 12 of the main frame 10.

The pile yarns A, B extend forwardly in parallelization from the pile yarn separators 70 and pass over and partially around an idler roll 76 (Figures 2, 3 and 4-A) at which point the sheets of pile yarns A, B are split and pass beneath respective let-off rolls 77, 78 suitably journaled on the superstructure or upper auxiliary framework 74. The let-off roll 78 is shown as being of substantially greater diameter than the let-off roll 77, but these rolls 77, 78 may be of the same size depending upon the desired amount of variation in the rate of feed of the corresponding pile yarns.

Both of the rolls 77 and 78 are intermittently driven, by means to be later described, for letting-off the respective sheets of pile yarns A, B. Suitable pressure rolls 81, 82 are disposed above the respective let-off rolls 77 and 78 for maintaining the corresponding pile yarns in frictional engagement with the respective let-off rolls 77, 78. Opposite ends of the pressure roll 81 are journaled in U-shaped notches provided therefor in the upper ends of a pair of substantially upright arms 84, 85 mounted on the upper ends of the respective bars 68, 69 of the superstructure 74, and which arms 84, 85 also serve as bearing blocks in which reduced opposite ends of the upper let-off roll 77 are journaled (Figures 2, 3, 4-A and 12).

Opposite ends of the lower pressure roll 82 are journaled in bearing blocks 90, 91 fixed on the free ends of respective pivoted arms 92, 93 (Figures 2 and 3) which extend rearwardly and are pivotally supported on respective rear upright frame members 94, 95 of the built-up side frame members 72, 73 of the superstructure 74. As the sheet of pile yarns A leaves the upper pressure roll 81, it is split into two sheets of pile yarns then indicated at A' and A", for the purpose of forming the particular pattern shown in Figures 1, 7 and 14.

Each of the sheets of pile yarns A' and A" is, in this instance, divided into three spaced groups of pile yarns. Also, the sheet of pile yarns B passes upwardly from the lower pressure roll 82 at an angle in Figure 4-A and passes over the rearmost of a group of five guide rods or lease rods indicated at 101 to 105, inclusive, where the sheet B is split into two sheets B', B". The lease rods 101 through 105 are parts of a pile yarn tension compensating means to be later described in detail.

As heretofore stated, in forming the particular pattern shown in Figures 1, 7 and 14, both sheets of pile yarns A, B may be taken from a common beam and only one of the let-off rolls 77, 78 need be used, since the amount of pile yarn let-off is the same for all of the pile yarns in each warpwise repeat and the rate at which the pile yarns are let off is determined by the average length of pile yarn used in forming each repeat rather than in forming individual loops. Of course, when relatively short loops are being formed from some of the yarns as compared to relatively long loops being formed with others of the yarns, the amount of pile yarn taken up at the weaving zone with each pick varies and I have provided the two forms of tension compensating means (Figures 4–A and 4–B, respectively) to compensate for temporary variations in the amount of pile yarn taken up. As above stated, the pile yarn tension compensating means will be later described.

Now, in weaving fabrics such as that shown in Figures 17 and 18, wherein some of the pile yarns are formed into relatively long loops for a substantial part of the length of, or throughout the length of, the fabric as shown in Figure 17, or wherein relatively short loops are formed from some of the pile yarns throughout a substantial part of the length of, or throughout the length of, the fabric as show in Figure 18, then, the two let-off mechanisms embodied in the let-off rolls 77 and 78 would be required as well as the two sheets of pile yarns A and B being drawn from separate beams. The two pile yarn let-off mechanisms will now be described.

Pile yarn let-off mechanisms

As heretofore stated, the pile yarns A' and A'' need be let-off at a different rate than the pile yarns B' and B'', in order to produce loop pile patterns of the type shown in Figures 17 and 18. There are various types of mechanisms which may be provided for imparting intermittent rotation to the let-off rolls 77 and 78, the particular let-off mechanisms to be presently described being considered most desirable.

The mechanism for imparting intermittent rotation to the upper let-off roll 77 is best shown in Figures 2, 4, 4–A and 12 wherein it will be observed that one reduced outer end of the let-off roll 77 has a suitable ratchet mechanism thereon which is shown in the form of an overiding clutch comprising a hub 110 (Figure 12) fixed on one reduced end of the let-off roll 77 and which is provided with a plurality of slots or notches 111 in its periphery in which spring pressed rollers or balls 112 are loosely mounted.

The surfaces of the notches 111 nearest the axis of hub 110 are disposed at an acute angle with respect to a line drawn from the center of the hub 110 and bisecting each of the slots or notches 111 so the rollers or balls 112 are normally urged into engagement with the inner periphery of a substantially annular housing 113 loosely mounted on the hub 110. The annular housing 113 has a radially extending arm 115 thereon which, when moved in a counterclockwise direction in Figure 12, tends to move the balls or rollers 112 toward the large end of the notches 111 and thereby moves independently of the hub 110 and the upper let-off roll 77.

Conversely, upon each upward movement or clockwise movement of arm 115 and housing 113, since the spring pressed balls or rollers 112 are also urged in a clockwise direction, they tend to move with the housing 113 toward the small end of the notches 111 so that clockwise movement of the housing 113 imparts like movement to the hub 110 and the let-off roll 77.

In order to impart oscillatory movement to the housing 113, its arm 115 has the upper end of a link or connecting rod 116 pivotally connected thereto which extends downwardly in Figures 2, 4–A and 4 and is pivotally connected to the free end of a crank arm or cam lever 117 pivoted, as at 120 (Figure 4), on the main frame 10 and having a follower 121 thereon which engages the periphery of a cam wheel 122. The cam wheel 122 is fixed on a transverse shaft 123 suitably journaled on the frame members 11 and 12 of the main frame 10. Shaft 123 has a gear 124 fixed thereon which meshes with a gear 125 fixed on the main drive shaft 36.

As heretofore stated, the shaft 36 rotates one-third of a revolution with each pick of the loom and the ratio of the gears 124 and 125 is such that the shaft 123 rotates a quarter revolution with each pick of the loom to thereby impart a partial revolution or a step in rotation to the upper let-off roll 77 with each "pile pick" of the loom, a "pile pick" being every other pick in this instance, as exemplified by the fabric shown in Figure 16. Intermittent rotation is imparted to the lower let-off roll 78 by means of worm gear 130 (Figure 2) fixed on one end of the roll 78 and which meshes with a worm 131 fixed on the upper end of an upright shaft 132 (Figures 2 and 4–A).

The shaft 132 is journaled in vertically spaced bearing blocks 133, 134 and 135, the bearing block 133 being suitably secured to a horizontally disposed frame member 136 which is a part of the superstructure side frame member 72. The bearing block 134 is suitably secured to a frame member 137 which extends rearwardly and is fixed to a lower upright frame member 138 of the superstructure side frame 72.

The upper end of the frame member 138 is suitably secured to the lower end of the frame member 94 (Figure 4–A). The bearing block 135 is suitably secured to the side frame member 11 of the main frame 10 (Figure 4). The lower portion of shaft 132 has a ratchet wheel 141 fixed thereon (Figure 4), which is engaged by a ratchet pawl 142 pivoted on a hub member 143. The hub member 143 is oscillatably mounted on shaft 132 and has one end of a link 144 pivotally connected thereto, as at 145. The other end of said link is connected to the upper end of a cam lever 146 whose lower end is pivotally mounted, as at 147, on a bracket 150 carried by a rear transverse frame member or girt 151 whose opposite ends are suitably secured to the side frame members 11 and 12 of the main frame 10.

The medial portion of lever 146 has a follower 152 thereon which is urged into engagement with the periphery of a five-lobe cam wheel 153, fixed on the main drive shaft 36, by means of a tension spring 154. The number of lobes on the cam wheel 153 may be varied as desired, the five lobes being provided in order to impart relatively slight rotational movement to the lower let-off roll 78 (Figure 4–A) in rapid succession to insure that the pile yarns B' and B'' are fed at a rate of speed corresponding to the rate called for by the loop forming yarn guides, to be later described, without unduly slackening the pile yarns B' and B''.

Pile yarn tension compensating means

There are two forms of pile yarn tension compensating means shown in the annexed drawings, one form, which will be first described, being shown in Figures 1, 2, 3 and 4–A. Another form of pile yarn tension compensating means is shown somewhat schematically in Figure 4–B. In the form of pile yarn tension compensating means shown in Figures 1, 2, 3 and 4–A, it will be observed that the sheet of pile yarns B passes over and partially around the lease rod 101 where it is split and the sheet B'' thus formed passes above the lease rods 102, 103 and 104.

The two sheets of pile yarn A'' and A', formed by splitting the sheet A, pass from the pressure roll 81 and engage the respective lease rods 102 and 103. The sheets of pile yarns B', A'', A' and B'' pass downwardly from the respective lease rods 101 to 104, inclusive, and then pass substantially half-around respective pile yarn tension compensating rods, rollers or bars 161 to 164, inclusive, after which the sheets of pile yarns B', A'', A' and B'' pass upwardly and over the respective lease rods 102, 103, 104 and 105, from whence the pile yarns pass forwardly in parallel relationship to and partially around an idler roll 165 journaled at opposite ends thereof in bearing blocks 166 mounted on the front ends of the corresponding bars 68, 69 of the superstructure 74.

Opposite ends of the lease rods 101 to 105, inclusive, are mounted in plates 170, 171 (Figures 2, 3 and 4-A) which extend forwardly and rearwardly and whose opposite ends are fixed to the vertical legs of respective inverted substantially U-shaped frames 172, 173 suitably secured to the respective bars 68, 69. The upper horizontal portions of the inverted U-shaped frames 172, 173 are spanned by and suitably support a pair of forwardly and rearwardly spaced substantially parallel and horizontally disposed frame members 174, 175.

The horizontally disposed transverse bars or frame members 174, 175 extend outwardly beyond the vertical plane of the side frame members 12 and 13 of the main frame 10 and the superstructure 74, respectively (Figure 1), and support opposite ends of a plurality of spaced shafts 176 to 179, inclusive. The shafts 176, 177 have respective groups of four grooved pulleys 182, 183 rotatably mounted thereon and the shafts 178, 179 have respective pairs of pulleys 184, 185 rotatably mounted thereon.

Opposite ends of each of the tension compensating bars or rods 161, 162, 163 and 164 are journaled in brackets 186, 187 (Figures 1, 2 and 4-A). Each of the brackets 186 is suspended from one end of a pliable element 190, such as a strap, tape, cord or cable and each of the brackets 187 is suspended from one end of a pliable element 191, similar to element 190. The straps or pliable elements 190 extend upwardly from the bracket 186 and are mounted on the corresponding pulleys 182 and then extend across the loom, as best shown in Figure 1, and are suitably connected to the corresponding pliable elements 191 which are, in turn, mounted on the corresponding pulleys 183.

Two of said strap members or pliable elements 191 pass over the corresponding pulleys 184 and the other two of said elements 191 pass over the pulleys 185, from whence the pliable elements 191 extend downwardly and each has a suitable weight 193 connected thereto. Thus, the weights 193 serve to partially counter-balance the weight of the tension compensating rods, bars or rollers 161, 162, 163 and 164 independently of each other, whereby the amount of tension or pressure exerted on the sheets of pile yarns A', A", B' and B" may vary relative to each other.

In order to prevent excessive forward and rearward swinging movement of the tension compensating rollers 161, 162, 163 and 164, there are disposed below opposite ends of the lease rods 101, 102, 103, 104 and 105 a pair of upper plates 197, 201 and respective lower plates 198, 202 in which five vertical guide rods 195, 196 at each side of the loom are fixedly mounted (Figures 1 and 4-A). The inner edge of each of the plates 197, 198, 201 and 202 is preferably provided with notches therein through which the ends of the corresponding tension compensating rods 161, 162, 163 and 164 and the corresponding brackets 186 and 187 may freely pass during the course of vertical movement thereof as permitted by variations in the amount of pile yarn taken up during the formation of loops therefrom.

The outer ends of the upper plates 197, 201 are suitably secured to the upper bars 68, 69 of the superstructure 74 and the outer ends of the lower plates 198 and 202 are suitably secured to the frame member 136 of the side frame member 72 and a corresponding frame member 204 (Figure 3) which is a part of the superstructure side frame member 73.

*Modified form of pile yarn tension compensating means*

A modified form of pile yarn tension compensating means is shown somewhat schematically in the upper portion of Figure 4-B, which may be used in lieu of the structure shown in Figure 4-A for more accurately assisting in maintaining individual yarns or adjacent groups of a few of the pile yarns under tension and which may be desirable in weaving fabrics having fancy and irregularly-shaped loop or cut pile design areas incorporated therein, as compared to the fabric shown in Figures 1, 7 and 14. Since most of the parts shown in Figure 4-B, other than the specific pile yarn tension compensating means, are substantially the same as that shown in Figure 4-A, like reference characters shall apply to those parts in Figure 4-B which are identical or substantially the same as the parts shown in Figure 4-A in order to avoid repetitive description.

It will be observed in Figure 4-B that the tension compensating rods or rollers 161, 162, 163 and 164, and the counter-balancing means therefor are omitted and, instead, the sheets of pile yarns B', A", A' and B" pass downwardly from the respective lease rods 101, 102, 103 and 104 and one or more of the yarns in each of the sheets B', A", A' and B" passes through a loop member 205 from which a weight or lingoe 206 is suspended. Thereafter, the yarns in the respective sheets B', A", A' and B" pass upwardly from the respective loops 205 and over the respective lease rods 102, 103, 104 and 105, from whence they pass, in parallelization, forwardly over the roll 165.

Thus, each of the strands in each of the sheets of pile yarns B', A", A' and B" is provided with an independent tension compensating means. Although the same type of pile yarn let-off mechanisms are shown in both Figures 4-A and 4-B, it is contemplated that each of the yarns in each of the sheets A', A", B' and B" may be taken from a creel or separate spool and provided with individual let-off means to further maintain the tension constant in each of the pile yarns, as may be required in forming intricate patterns in the fabric from pile loops of varying height or length.

*Loop forming pile yarn guides and operating means therefor*

The pile yarns extend forwardly from either form of pile yarn tension compensating means and, as best shown in Figure 4-A, they then pass substantially half-around the idler shaft 165 from whence they extend downwardly at an angle and pass over another idler roll 235. Opposite ends of the idler roll 235 are journaled in bearing blocks 236 suitably secured to respective front upper upright frame members 238, 239 (Figures 1, 2, 3 and 4-A) which are parts of the respective superstructure side frame members 72, 73.

The pile yarns then extend downwardly from roller 235 and successively pass beneath and over a pair of rods 242, 243 from whence each of the strands of pile yarn passes downwardly through an eye 244 in the free lower end of a loop forming pile yarn guide 245, there being a plurality of such pile yarn guides 245 disposed in closely spaced relationship to form a row of said pile yarn guides extending transversely of the loom, forwardly of the reed. These loop forming pile yarn guides 245 may be of substantially the same construction as, and operated by the same means as, disclosed in said Clark Patents Nos. 2,437,378 and 2,437,379. Opposite ends of the rod 242 are mounted in brackets 250 carried by angularly disposed frame members 251, 252 whose rear ends are fixed to members 138, 138a of the superstructure side frame members 72, 73, respectively.

Opposite ends of the rod 243, which may be termed as a tension rod, or take-up rod, are mounted in the front free ends of levels 254, 255, pivoted at 256 on respective brackets 257, 258 fixed to respective upright portions 261, 262 (Figures 2, 3, 5, 6 and 7) of the respective side frame members 11, 12 of the main frame 10. The inner or rear end of each of the levers 254 is slidably penetrated by a link 265 having a restraining means 266 on its upper end which limits upward movement of the levers 254, 255 (Figure 4-A).

The lower end of each link 265 is pivotally connected to the inner end of a substantially L-shaped lever 268, the horizontal leg of which is fixed, intermediate its ends, on a transverse rocker shaft 267. Opposite ends of the rocker shaft 267 are journaled in brackets 270, 271 (Figures 4–A and 3, respectively) suitably secured to the upright portions 261, 262 of the side frame members 11, 12 of the main frame 10.

The substantially vertical leg of each of the L-shaped levers 268 extends upwardly adjacent the rod 243 and each has the upper end of a tension spring 273 connected thereto. The lower ends of springs 273 are connected to the front ends of the levers 254 and 255. Thus, the tension rod 243 is normally urged upwardly under relatively light pressure by the tension springs 273.

*Operating and supporting means for pile loop forming yarn guides*

Fixed on the rocker shaft 267 and extending forwardly from opposite ends thereof are arms 275, 276 (Figures 4–A and 7) upon which the medial portions of respective pile yarn guide supporting levers 277, 278 are pivotally mounted for lateral movement, by means of bolts 279. The front end of each of the levers 277, 278 has a downwardly and forwardly extending angular disposed bracket 282 suitably secured thereto. The brackets 282 support opposite ends of a pair of spaced parallel yarn guide supporting bars 283 (Figures 4–A, 7 and 13) which extend across the loom and to which the upper ends of the loop forming yarn guides 245 are suitably connected. Suitable spacers may be provided between the bars 283 to permit the pile yarns to pass therebetween in their course from the tension rod 243 to the eyes of the yarn guides 245. Also, a suitable pin board 286 is provided above the bar 283 for guiding and separating the pile yarns in their course from the tension rod 243 to the pile yarn guides 245.

The inner or rear end of each of the pile yarn guide supporting levers 277, 278 has the outer end of a link 290 pivotally connected thereto, only one of which is shown in Figure 7 and these links 290 may be connected to and controlled by mechanism identical to that shown in Figure 3, for example, of said Clark Patent No. 2,437,378 for laterally shifting the loop forming yarn guides 245.

Since the lateral shifting means for the loop forming yarn guides 245 does not constitute part of the present invention, a further description and illustration thereof is deemed unnecessary.

In order to impart vertical oscillation to the brackets 275, 276, the rocker shaft 267 and the substantially L-shaped levers 268, it will be observed in Figure 4–A that the upper end of a link or connecting rod 291 is pivotally connected to the bracket 275 adjacent its free front end and the lower end thereof curves rearwardly and is pivotally connected to the lever 117 adjacent the free end thereof (Figure 4). Thus, each time a step in rotation is imparted to the upper let-off roll 77 by the link 116 and the mechanism shown in Figure 12, the pile yarn guides 245 are also moved upwardly and then downwardly following the insertion of alternate double weft yarns between the warp yarns 15 and 16 and over the strands of pile yarn, in forming the loops, in cooperation with the improved loop forming fingers to be later described.

The predominant features of the invention as thus far described reside in the means for directing the pile yarns to the loop forming pile yarn guides 245, including the let-off mechanisms and the pile yarn tension compensating means which is shown and described in two forms, but wherein various other forms of tension compensating means may be employed within the scope of the present invention.

It might be stated that the springs 273 and the levers 254, 255 cause the tension rod 243 to move upwardly relative to the rocker arms 275, 276 and levers 277, 278 in accordance with common variations in tension in all of the sheets of yarn A', A", B' and B" to assist in maintaining them under tension between the tension compensating devices heretofore described and the base fabric F during the operation of the pile loop forming yarn guides 245 in handling the pile yarn during the weaving operation. Of course, downward movement of the tension rod 243 is limited by the abutments, stops or restraining means 266 (Figures 4–A and 7).

*Loop forming fingers or gauges and one form of control means therefor*

In Figures 1, 2, 3, 4, 4–A and 5 to 11, inclusive, the loom has incorporated therein a first form of pattern controlled mechanism in association with the loop forming fingers, gauges or wires, which form is particularly adaptable to the manufacture of fabrics having loop patterns therein formed by loops of varying length substantially of the type embodied in the fabric shown in Figures 1, 7 and 14. A modified or second form of means for controlling the loop forming fingers, gauges or wires is shown somewhat schematically in Figure 4–B.

Before describing the loop forming fingers, it might be stated that the pile fabric base is woven in the usual manner; that is, the warp yarns 15 (Figures 2 and 3) are spaced fillerwise or weftwise of the loom and serve as stuffer warp yarns (see Figures 15 and 16) adjacent each of which one of the warp yarns 16 is disposed. Thus, the warp yarns 16, which are maintained under lesser tension than the yarns 15, serve as binder warp yarns. Figures 15 and 16 show a preferred form of base fabric woven as a result of a method of weaving known as a two-shot cycle. Considering the fabric in Figure 16 as being produced from the left-hand side of the drawing towards the right, the warps are open with 15 up and 16 down, the filler or double weft yarn W would be placed through the warp and beat up.

Because the stuffer warp 15 is taut and above the filler W and the binder warp 16 is below the filler W, when this shot of filler is beat up, it goes into the base fabric at a lower level than the next shot of filler. In the next step the warp 15 is shedded down and the binder warp 16 is up. The pile yarn is inserted into the shed by the guides 245 and a shot of filler W placed over the strands of pile yarn below the binder warp 16 and above the stuffer warp 15.

As the guides 245 descend into the shed, the pile yarn is looped over the fingers somewhat taut and held in this condition until the shot of filler is made and the needle 53 withdrawn from the shed whereupon the guides 245 ascend drawing the shot of filler previously inserted over the pile yarn against the under side of the loop forming fingers 300. The filler and pile loops are then beat up with the filler at a high level and the pile loops at a low level in the fabric, with the filler through the base of the pile loops and the pile loops beat snugly against the first-mentioned shot of filler.

For the next step, the binder warp 16 is shedded down and the stuffer warp 15 is shedded upward and the cycle of operations repeated as the fabric is woven, the fingers 300 being provided with upper edge portions of different height for forming relatively short loops S, progressive loops S–1, of gradually increasing length, and relatively long loops L. The fingers 300 will now be described in detail.

Disposed adjacent the loop forming pile yarn guides 245 is a plurality of improved loop forming fingers, guides or wires generally designated at 300, there being one of these loop forming fingers 300 for each of the pile yarn guides 245. The pile yarn guides 245 are adapted to pass between the corresponding loop forming fingers 300 in front of the reed 40 and carry the pile yarn below the fingers 300 and then to the shed of the loom so that the needle 53 passes through the loops of pile yarn thus formed and positions double weft yarns between the warp yarns, over the strands of pile yarn and below the fingers 300 in the usual manner, substantially as disclosed in said Clark patents.

In weaving the particular pile loop pattern shown in Figures 1, 7 and 14, in this instance, three pile yarns are used in forming each of the short-loop or recessed areas *a, b, c, d, e* and *f* in each repeat and, of course, for forming the corresponding solid, raised or embossed long-loop areas extending warpwise between adjacent rows R (Figure 14). Thus, pile yarns in sheets B', A', A" and B" are employed in forming the portions of the fabric embraced by the respective recessed areas or short-loop areas *a, b, c* and *d* and, of course, pile yarns in sheet A" and A' are also used in forming the loops in the portions of the fabric embraced by the respective areas *e* and *f* in each repeat of the pattern. Accordingly, the loop forming fingers 300 are divided into sets, each including spaced groups of three adjacent fingers 300.

In Figure 10, a few of the loop forming fingers are illustrated in which the groups of fingers 300 over which the loops are formed from the respective pile yarns A', A", B' and B" are bracketed and respectively designated at C', C", D' and D", there being only a single repeat of said groups illustrated in Figure 10. In other words, the fingers 300 in groups D', C', C" and D" cooperate with the pile yarn guides 245 in forming the portions of the fabric embraced by the respective areas *a, b, c* and *d* in Figure 14.

Each finger 300 has an elongated shank 300a and it will be observed in Figures 7 and 10 that the shanks of all of the loop forming fingers 300 are mounted in first, second, third and fourth finger holding and guiding bars 301, 302, 303 and 304. Each of the bars 301, 302, 303 and 304 has a longitudinally extending groove or keyway 305 therein in which a plurality of relatively short longitudinally spaced keys 306 are positioned. The shank 300a of each of the loop forming fingers 300 has a notch 307 in its lower portion, intermediate its ends, for engagement with the corresponding key 306 to thereby anchor the fingers 300 to certain of the finger holding and guiding bars 301, 302, 303 and 304.

Each of the keys 306, in this instance, is of such length that it spans the distance between four of the loop forming fingers 300 to permit the fingers 300 at opposite ends thereof to slidably engage opposite ends of the corresponding key to thereby assist in maintaining the key in the proper position in the keyway 305 and to maintain three of the fingers 300 in engagement therewith and in fixed relationship to one each of the corresponding finger holding and guiding bars, such as shown in association with the bar 301 in Figure 11.

Thus, in this instance, each of the groups of fingers D' is held in fixed relation to bar 301 and relative movement is permitted between the bars 302, 303, 304, and the groups of fingers D'. Each of the groups of fingers C', C" and D" is also slidably mounted in the bars 301, 302, 303 and 304, with the exception that each of the group of fingers C" is anchored to the bar 302, each of the groups of fingers C' is anchored to the bar 303 and each of the groups of fingers D" is anchored to the bar 304 by means of the corresponding keys 306.

The upper edges of the shanks 300a of the loop forming fingers 300 are preferably slightly below flush with the upper surfaces of the finger holding and guiding bars 301, 302, 303 and 304 and the finger holding and guiding bars 301, 302, 303 and 304 have respective cap bars 311, 312, 313 and 314 suitably secured to the upper surfaces thereof for retaining the loop forming fingers 300 in the slots provided therefor in the finger holding and guiding bars 301, 302, 303 and 304. The front portions of the shanks 300a are also guided in a guide bar 309 disposed in back of the reed 40 and fixed in brackets 310 (Figure 1) carried by the frame members 251, 252. A cap 308 is fixed to bar 309 for retaining the fingers 300 therein.

One of the important features of the present invention is the provision of a stepped construction at the free end of each of the fingers 300 to form a relatively low or narrow nose portion 300b (Figure 24) on the front or free end of each of the loop forming fingers 300 which, in this instance, is connected to the shank of each finger 300 by means of an inclined upper surface portion 300c so that, when the pile loops are formed over the narrow nose portions 300b of any of the loop forming fingers 300, the loops S (Figures 15 and 16) are relatively short to form recessed areas such as the areas *a* to *f*, inclusive, in each of the rows R of Figure 14. The free end of each nose portion 300b is preferably tapered or rounded as shown in Figure 24. Also, as any of the fingers 300 are advanced, loops of progressively increasing height or length, such as loops S–1 in Figure 16, are formed over the inclined upper surface portions 300c thereof and, when any of the fingers 300 are fully advanced, relatively long loops L are formed over the shanks 300a of the fingers 300, since the shanks form relatively high upper surface portions as compared to the nose portions 300b.

It is apparent that when any of the fingers 300 are advanced, following the formation of relatively short loops S over the nose portions 300b thereof, the progressively increasing length of loops S–1 formed by the inclined upper surface portions 300a is caused because it is necessary that the loop forming fingers 300 are advanced at the same rate as that at which the fabric F is taken up by the roll 60 in Figures 2 and 3.

This produces a tapered appearance to the trailing edge of each of the recessed areas *a* to *f*, inclusive, in each row R and, in order that such recessed areas are symmetrical in appearance, the shanks 300a of the corresponding fingers 300 are also gradually withdrawn from loop forming position at the leading portion of each of said recessed areas to also produce a tapered effect at the leading edge of said recessed areas.

If so desired, the inclined upper surface portions 300c disposed between the shanks 300a and the nose portions 300b of the fingers 300 may be omitted, as shown in Figure 25, to provide a clear line of demarcation between adjacent raised and recessed areas formed from relatively long and relatively short pile loops, respectively. This is possible because, as heretofore stated, the fingers 300 are advanced at the same rate at which the fabric moves as it is taken up by the take-up roll 60.

Now, in order to impart relative movement to the finger holding and guiding bars 301, 302, 303 and 304, and the corresponding groups D', C', C" and D" (Figure 13) of loop forming fingers 300 in accordance with a predetermined pattern, opposite ends of each of the finger holding and guiding bars 301, 302, 303 and 304 each has a guide block 320 fixed thereon, and the guide blocks 320 at each side of the loom are mounted for forward and rearward angular movement on a guide rod 321 which extends forwardly and rearwardly, at a slight angle, with its rear end at a slightly higher level than its front end to provide for angular positioning of the finger holding and guiding bars 301, 302, 303 and 304.

Each of the guide rods 321 is fixed in a pair of guide blocks 322, the guide blocks 322 at one side of the loom being secured to the angularly disposed frame member 251 and, at the other side of the machine, being secured to the angularly disposed frame member 252 (Figures 2, 3, 4, 4–A, 6 and 7). The front ends of respective pairs of links 325, 326, 327 and 328 are pivotally connected to opposite ends of the finger holding and guiding bars 301, 302, 303 and 304. The rear ends of the links 325, 326, 327 and 328 are pivotally connected to the lower ends of respective crank arms 331, 332, 333 and 334 (Figures 4–A and 7) whose upper ends are fixed on respective rocker shafts 335, 336, 337 and 338.

The rocker shafts 335, 336, 337 and 338 are journaled in angularly disposed frame members 341, 342 spaced above the respective frame members 251 and 252 and having their rear portions suitably secured to the outer surfaces of the lower upright frame members 138, 138a of the respective superstructure side frame members 72, 73 (Figures 4–A and 3, respectively). The front portions of the angularly disposed frame members 341, 342 are suitably secured to upright frame members 344, 345 (Figures 2 to 7, inclusive) whose upper ends are fixed to the side frame members 11 and 12 of the main frame 10.

It will be observed in Figures 1, 2 and 5 that corresponding ends of the rocker shafts 335, 336, 337 and 338 extend outwardly substantially beyond the side frame member 11 of the main frame 10 and have respective crank arms or rocker arms 350, 351, 352 and 353 fixed thereon and extending radially forwardly therefrom. The rocker shafts 335, 336, 337 and 338 are of different lengths and the outer ends of shafts 336, 337, 338 are journaled in suitable bearings 354 carried by respective frame members 355, 356 and 357 which are parts of a main frame extension broadly designated at 360.

The main frame extension 360 also comprises a front upright frame member 361 having arcuate leg portions 362 thereon (Figure 2) which rest upon the surface supporting the loom. The front end of the frame member 357 is suitably secured to the upper portion of frame member 361 and the rear ends of the frame members 355, 356 and 357 are fixed to a common upper transverse frame member 363. The proximal ends of the horizontally disposed frame members 357, 363 are fixed on the upper end of a rear leg or upright frame member 364 and the other end portion of the frame member 363 is suitably secured to the lower upright frame member 138 of the superstructure 74.

Suitably secured to the rear surface of frame member 363, and projecting rearwardly therefrom, is a substantially U-shaped bracket or framework 367 which is a part of a pattern device broadly designated at 368 and which pattern device is constructed, and operates in substantially the same manner as, a head motion with a multiplier mechanism of the type usually employed for controlling the hardnesses or vertically shiftable shuttle boxes in some types of looms (Figure 5).

One leg of the frame 367 has a tubular shaft 369 journaled therein on which a pair of cog wheels or sprocket wheels 370 are fixedly mounted and which wheels are engaged by a primary pattern chain 371. The pattern chain 371 has a plurality of washers or projections 372 (Figure 6) thereon which are adapted to engage a plurality of respective vibrator levers or pattern jacks 375 to 379, inclusive (Figures 2, 5 and 8). The rear ends of the pattern jacks 375 to 379, inclusive, are pivotally mounted on a pivot shaft 380 fixed on the rear end of the frame 367 and, when said pattern jacks are not engaged by a projection or washer 372 on the pattern chain 371 (Figure 6) their front portions rest upon an eccentric 381 fixed on a shaft 382 (Figure 8) mounted in the rear portion of an outboard bracket 383 whose front portion is suitably secured to the frame member 363.

The right-hand end of the eccentric 381 in Figure 5 has a handle 384 thereon for manual rotation of the shaft 382 and the eccentric 381 for maintaining all of the pattern jacks 375 to 379, inclusive, in raised position, when desired, although high and low portions of the pattern chain 371 may be disposed beneath the same. The manner in which the pattern chain 371 is driven will be later described.

Now, the pattern jacks 375, 376, 377 and 378 are provided for imparting movement to the respective rocker arms 350, 351, 352 and 353; for rocking the respective rocker shafts 335, 336, 337 and 338. Since the intervening connections between each of the vibrator levers or jacks 375, 376, 377 and 378 and the respective rocker arms or crank arms 350, 351, 352 and 353 are identical, only the mechanical connections between the pattern jack 376 and the rocker arm 351 will be described in detail, since this is most clearly illustrated, and like parts between the pattern jacks 375, 377, 378 and the respective rocker arms 350, 352, 353 will bear the same reference character to avoid repetitive description.

As best shown in Figures 5 and 6, the upper end of a link or connecting rod 390 is pivotally connected to the free end of the rocker arm or crank arm 351 and its lower end is pivotally connected to the free end of a cam lever 391 having a follower 392 thereon which is urged against the periphery of a cam wheel 393 by a tension spring 389. The cam lever 391 is pivoted on a shaft 394 whose opposite ends are fixed in blocks 395 fixed on the upright frame members 344 and 361 (Figures 2, 5, 6 and 7).

Also, pivotally mounted on the shaft 394 adjacent each of the cam levers 391 is one end of a lever 396, having a roller or disk 397 thereon which is resiliently urged, by means of a spring 402, into successive engagement with a plurality of equally spaced arcuate cavities 401 in the periphery of a cam restraining wheel 400. The rear end of each tension spring 402 is connected to the free end of the corresponding arm 396. The front ends of the springs 402 are connected to a common spring anchor rod 403 (Figure 5) carried by the needle track supporting frame 50 heretofore described. Disposed between each cam wheel 393 and its adjacent cam restraining wheel 400 is a ratchet wheel 406 (Figures 5 and 6). Each of the cam wheels 393, the ratchet wheels 406 and cam restraining wheels 400 may be integrally formed as a set or suitably secured together.

All of the cam wheels 393, cam restraining wheels 400 and ratchet wheels 406 are rotatably mounted on a common shaft 407 fixed in blocks 410, one of which is carried by the upright portion 261 on the side frame member 11 of the main frame 10 (Figures 2, 4, 5 and 7) and the other of which is suitably secured to the frame member 361 of the main frame extension 360.

Each of the ratchet wheels 406 is adapted to, at times, be engaged by the free end of a ratchet pawl 412 which extends downwardly in Figure 6 and is pivotally mounted adjacent the free end of a cam lever 413. The cam levers 413 are pivotally mounted on a common shaft 414 fixed in spaced blocks 415. The blocks 415 are suitably secured to a horizontally disposed frame member 416 (Figures 2, 5 and 6), one end of which is supported on and suitably secured to a conventional gear casing 417, which is a part of the needle track supporting frame 50, and the other end of which is suitably secured to the foremost leg portion 362 of the upright frame member 361.

Each cam lever 413 has a cam follower 420 thereon which engages the periphery of a corresponding cam wheel 421. All of the cam wheels 421 are fixed on a common jack shaft 422, opposite ends of which are journaled in bearings 423, one of which is suitably secured to the gear casing 417 and the other of which is secured to one of the arcuate leg portions 362 of the upright frame member 361 (Figures 2 and 6). Each cam follower 420 is urged into engagement with the periphery of the corresponding cam wheel 421 by suitable spring means in the form of a torsion spring 425.

Each of the ratchel pawls 412 is normally urged into engagement with the corresponding ratchet wheel 406 by suitable spring means such as a torsion spring 426. It will be observed in Figures 5, 6 and 7 that the cam shaft or jack shaft 422 has a pinion 427 fixed thereon which meshes with a gear 430 fixed on the main drive shaft 36 so the cams 421 rotate continuously and consequently impart continuous reciprocatory movement to the cam levers 413 and the ratchet pawls 412. Each of the ratchet pawls 412 has one end of a control cable, strand or pliable element 431 connected thereto (Figures 5 and 6) which extends through an eye board or yarn guide board 432, one end of which is suitably secured to the side frame member 11 of the main frame 10 and the other end of which is connected to a frame member 433 extending rearwardly from the upright frame member 361 (Figures 2 and 5).

The cables 431 extend upwardly and rearwardly at an angle from the thread board or eye board 432 and pass through another thread board or eye board 434 (Figures 2, 5, 6 and 7) fixed to a transverse frame member 435, one end of which is suitably secured to the side frame member 11 of the main frame 10 and the other end of which is bent forwardly and suitably secured to the leg 364 of the main frame extension 360. The cords 431 then extend upwardly and are connected to the corresponding vibrator levers or pattern packs 375, 376, 377 and 378, each by means of a looped rod 436 having its upper end connected to the hooked free end of the corresponding vibrator lever or pattern jack.

It is thus seen that, upon any one of the pattern packs 375, 376, 377 or 378 being moved upwardly by one of the washers 372 on the pattern chain 371, this moves the corresponding ratchet pawl 412 (Figure 6) out of engagement with the ratchet wheel 406, so that, although the ratchet pawl is caused to vertically reciprocate continuously by the corresponding cam 421 on the constantly driven shaft 422, it will only impart a step in rotation to the ratchet wheel 406, the cam restraining wheel 400 and the corresponding cam 393 when the corresponding pattern jack or vibrator lever is in lowered position (see pattern jack 376 in Figure 6).

In operation, when any one of the followers 392 is in engagement with the low point of the corresponding cam wheel 393 (Figure 6), the corresponding groups of loop forming fingers 300 are in withdrawn or rearward position so that relatively short loops are formed from the pile yarns over the nose portions 300b thereof, as shown in the lowermost portion of Figure 13. For example, assuming the pattern jack or vibrator lever 376 to be in lowered position as shown in Figures 6 and 23, and the rocker arm 351 to be in the lowered position with the cam follower 392 in engagement with the low point of the corresponding cam wheel 393, the finger holding bar 302 would then be in its rearward or withdrawn position and the loop forming fingers 300 in groups C' would also be in operative position, as exemplified by the three lowermost loop forming fingers 300 in Figure 13, so that relatively short loops S (Figures 15 and 16) are formed from the pile yarn over the nose portions 300b of the loop forming fingers 300 in each of the groups C'.

Since the pattern jack 376 is in lowered or operative position as shown in Figure 6, it is evident that step-by-step rotation is imparted to the corresponding cam wheel 393 to gradually raise the rocker arm 351 and to turn shaft 336 in a clockwise direction in Figure 6 or in a counterclockwise direction in Figure 4–A. It follows that this causes the free lower ends of the crank arms 332, the links 326 and the finger holding and guiding bar 302 to gradually move forwardly to thereby move the groups C' of loop forming fingers 300 forwardly at the same rate at which the fabric F is taken up by the take-up roll 60.

This causes the corresponding inclined upper surface portions 300c to gradually move into the loop forming zone until the shanks 300a of the loop forming fingers 300 in groups C' move into loop forming position so that loops S–1 (Figure 16) of gradually increasing length are formed as the inclined upper surface portions 300c advance past loop forming position and whereupon relatively long loops L are then formed over shanks 300a of the corresponding loop forming fingers 300 to form the solid, raised or embossed areas E between the rows R in Figure 14.

It is thus seen that all of the groups C', C'', D' and D'' are selectively controlled as to forward and rearward movement thereof by the pattern mechanism 368. Of course, when any one of the pattern jacks 375 to 378, inclusive, is in elevated position, the corresponding ratchet pawl 412 is held away from the corresponding ratchet wheel 406 so the height of the loops formed from the corresponding groups of loop forming fingers remains constant until the corresponding washer 372 again moves out of engagement with the lower surface of the corresponding pattern jack (Figures 6 and 8).

Also, if the operator desires that a substantial amount of fabric be woven with warpwise rows of loops thereon of constant height or length, the cam 381 may be rotated, in the manner heretofore described, to maintain all of the pattern jacks or vibrator levers 375 to 379, inclusive, in elevated position. This may be desirable in weaving fabric in which weftwise spaced warpwise extending rows of relatively short loops are formed with rows of relatively long loops between said rows of relatively short loops throughout the length of a piece of fabric.

It might be stated here that the groups of pile yarns in sheets B', A', A'' and B'' are formed into loops over the loop forming fingers 300 in the respective groups D', C', C'' and D'', the loop forming fingers 300 in groups D', C', C'' and D'' are held in fixed relationship by the respective finger holding and guiding bars 301, 302, 303 and 304 and the position of said finger holding bars 301, 302, 303 and 304 is determined by the respective pattern jacks 375, 376, 377 and 378.

*Pattern mechanism*

As heretofore stated, the form of pattern mechanism 368 shown in Figures 2, 5, 6, 8 and 9 is a form of dobby head motion with a multiplier which permits the pattern chain 371 to remain stationary for predetermined periods for the formation of a constant loop pattern during a predetermined number of picks by the loom.

The tubular shaft 369 slidably penetrates one of the legs of the U-shaped frame 367 and is rotatably mounted on a portion of a shaft 440 (Figures 5 and 9) which is journaled in the left-hand leg of the U-shaped frame 367 in Figure 5. Shaft 440 has a pair of axially spaced six-point Geneva wheels 441 and 441' mounted thereon, the Geneva wheel 441 being fixed on the shaft 440 and the Geneva wheel 441' being fixed to the left-hand end of the tubular shaft 369. The Geneva wheels 441, 441' are alternately driven by respective cranks 442, 442' integral with or suitably secured to respective hub members 443, 443'. The hub members 443, 443' are keyed, as at 444, 444' (Figure 8), for axial shifting movement on a tubular shaft 445 rotatably mounted on a shaft 446 fixed in the frame 367. The means for axially shifting the hubs 443, 443' will be later described.

The tubular shaft 445 (Figure 8) is driven continuously during the operation of the loom by means of a pair of gears 450, 451 fixed on the tubular shaft 445 and a jack shaft 452 respectively (Figures 2, 5, 6, 8 and 9). The jack shaft 452 is journaled in the legs of the U-shaped frame 367 and in a bracket 453 projecting rearwardly from the outer end of the rear frame member 363 of the main frame extension 360 in Figure 5.

Loosely mounted on the outer end of the shaft 452 is a sprocket wheel 455 (Figures 2 and 5), the hub of which is engaged by a manually shiftable clutch member 456 keyed for axial movement on the shaft 452 and being urged into engagement with the hub of the sprocket wheel 455 by a compression spring 457. The clutch member 456 is engaged by a yoke 460 (Figure 5) fixed to a hand lever 461 pivoted on a bracket 462 extending laterally from the bracket 453.

The sprocket wheel 455 is driven continuously during operation of the loom by means of a sprocket chain 463 mounted thereon which is also mounted on a sprocket wheel 464 fixed on the outer end of the cam shaft 422 (Figures 2, 5 and 6). The purpose of the manually shiftable clutch means 456 is to prevent rotation from being imparted to the shaft 452 and the parts of the pattern mechanism 368 when desired for the purpose of finding the correct pick after filling breaks, changing pattern chain, fixing some part of the loom, or in any event wherein the main drive shaft 36 is turned without inserting filling.

Also, in such events, it is necessary to move the cam 381 of Figure 8 so that all of the vibrator levers or pattern jacks 375 to 379, inclusive, are held out of operative position which, in turn, prevents the corresponding ratchet pawls 412 (Figure 6) from engaging and imparting movement to the corresponding ratchet wheels 406, since the shaft 422 rotates in either direction upon the main drive shaft 36 being rotated in either direction as would be necessary in finding the correct pick after filling breaks or in turning the shaft 36 for any reason without inserting filling.

The two cranks 442, 442' integral with the hubs 443, 443' being identical and the two Geneva wheels 441, 441' being identical, only the Geneva wheel 441 and the parts corresponding with the crank 442 will be described in detail and like parts associated with the Geneva wheel 441' and the crank 442' shall bear the same reference characters with the prime notation added (Figures 5, 8 and 9).

As best shown in Figure 9, the crank 442 carries a roller or pin 465 which is adapted to successively engage in slots 466 formed in the Geneva wheel 441. The crank 442 has an arcuate portion 467 which cooperates with arcuate recesses 470 in the Geneva wheel 441 to lock the same against rotation until pin 564 enters a slot 466.

The cranks 442, 442' are axially spaced when the hubs 443, 443' are in engagement and the portions of the hubs 443, 443' between the cranks 442, 442' are provided with peripheral grooves 471, 471' therein which are engaged by respective yokes 473, 473'. The yokes 473, 473' extend downwardly in Figures 8 and 9 and are fixed on respective guide rods 474, 474' mounted for movement parallel to the tubular shaft 445 in one of the legs of the U-shaped frame 367.

The distal ends of the rods 474, 474' have respective follower blocks 475, 475' fixed thereon whose lower edges are provided with respective notches 476, 476' which are engaged by the rounded upper ends of respective shifting levers 477, 477'. The respective shifting levers 477, 477' are pivoted, as at 480, 480', on opposite ends of a bar 481 fixed in one of the legs of the U-shaped frame 367.

The rounded upper ends of the shifting levers 477, 477' are normally urged away from each other by respective tension springs 482, 482' (Figure 8). The shifting levers 477, 477' have respective outwardly radially projecting arms 483, 483' integral therewith to which the lower ends of respective links 484, 484' are pivotally connected. The upper end of link 484 is pivotally connected to the free end of the pattern jack or vibrator lever 379.

It will be observed in Figure 9 that the link 484' extends upwardly, from arm 483' of the shifting lever 477', and curves rearwardly and then again extends upwardly between the shaft 440 and the tubular shaft 445, and is pivotally connected, as at 486, to a multiplier jack or multiplier vibrator lever 487. The multiplier jack 487 extends rearwardly and is pivotally supported on a pivot shaft 490 projecting inwardly from the rear end of the left-hand leg of the frame 367 in Figure 5. The medial portion of the multiplier jack 487 rides upon an endless multiplier chain 491, which may also be termed an auxiliary pattern chain, and which also has a plurality of spaced projections or washers 492 thereon which are spaced in accordance with a predetermined pattern. The multiplier chain 491 is mounted on sprocket wheels 493 (Figure 5) fixed on the shaft 440.

It is thus seen that, since the shaft 452 normally rotates continuously with operation of the loom, the tubular shaft 445 (Figures 5, 8 and 9) also rotates continuously. Assuming that one of the washers 372 is in engagement with, and maintains in raised position, the pattern jack 379, the hubs 443, 443', cranks 442, 442' and the intervening parts occupy substantially the position shown in Figure 8.

Thus, upon each revolution of the tubular shaft 445, a step in rotation is imparted to the star wheel or Geneva wheel 441, the shaft 440, the sprocket wheels 493 and the multiplier chain 491, due to successive engagement of the pin 465 on the crank 442 with the notches 466 in the Geneva wheel 441. This movement of the multiplier chain 491 continues until one of the rollers 492 thereon engages and raises the multiplier jack 487. Since the pins 465 and 465' are disposed in substantially diametrically opposed relationship, during the time that a roller 492 is moving into position to raise the multiplier jack 487, the arcuate portion 467' on the crank 442' is in engagement with the Geneva wheel 441'.

Thus, upward movement of the multiplier jack 487 imparts corresponding movement to the link 484', thereby moving the shifting lever 477' in a counterclockwise direction in Figure 8 to move the shaft 474, yoke 473' and crank 442' from right to left to move the hub 443' away from the hub 443. This positions the pin 465' in operating relationship to the Geneva wheel 441' and, upon engagement of the pin 465' on crank 442' with the Geneva wheel 441', a step in rotation is imparted to the tubular shaft 369, the sprocket wheels 370 and the finger pattern chain 371, thus moving the corresponding roller 372 out of engagement with the pattern jack 379.

The tension spring 482, combined with the weight of the pattern jack 379, causes shifting lever 477 to move in a counterclockwise direction, moving the shifting block 475, the shaft 474, the yoke 473 and the crank 442 therewith, from right to left in Figure 8, so that, as the pin 465' subsequently moves out of engagement with the Geneva wheel 441', the pin 465 will then be disposed out of operating position relative to the Geneva wheel 441. It follows that, with each revolution of the tubular shaft 445, a step in rotation is then imparted to the pattern chain 371 for selectively raising and lowering the pattern jacks 375 to 378, inclusive, and to thereby selectively vary the posiiton of the groups C', C", D' and D" of loop forming fingers 300, in the manner heretofore described.

This continues until a roller or projection 372 on the pattern chain 371 again moves into engagement with, and raises, the vibrator lever or pattern jack 379, returning the same to the position shown in Figure 8. As the pattern jack 379 is raised, the crank 442 is moved from left to right in Figure 8 to return the pin 465 thereon into alinement with the Geneva wheel 441 while the pin 465' remains in engagement with the Geneva wheel 441'. As the pin 465' moves out of engagement with the Geneva wheel 441', upon completion of imparting a step in rotation thereto, the pin 465 on the crank 442 then engages the Geneva wheel 441 to impart a step in rotation thereto in the course of which the roller on the multiplier chain 491 moves out of engagement with the multiplier jack 487.

The weight of the multiplier jack 487 and the spring 482' then cause the shifting lever 477' to move in a clockwise direction in Figure 8 to shift the shifting block 475', the shaft 474', the yoke 473' and the crank 442' from left to right to again return the parts to the position shown in Figure 8 thereby completing a cycle in the operation of the shifting mechanism of the multiplier.

Although each series of loop forming fingers 300, locked in engagement with each of the finger holding and guiding bars by means of the corresponding keys 306 (Figures 10 and 11), includes spaced groups of three loop forming fingers, this arrangement is provided, in particular, for forming looped fabric having short and long loop design areas therein of the type shown in Figures 1, 7 and 14 and it is to be distinctly understood that the number of loop forming fingers in each group of each series locked in engagement with each of the finger holding and guiding bars 301, 302, 303, and 304 may vary and the patterning may also vary as desired.

Also, the fabric may be formed with elongated warpwise extending areas in which spaced portions of some of the areas may be formed with long loops with short-loop portions therebetween and other warpwise extending areas may be provided with spaced portions having relatively long loops therein with portions therebetween having relatively short tufts or cut pile or vice versa.

Also, certain or all of said areas may be initially formed with spaced portions having relatively long loops therein with portions therebetween having relatively short loops therein and wherein both the long and short loops are severed so that the corresponding elongated warpwise areas are provided with recurrent short cut pile portions and recurrent long cut pile portions.

In order to form warpwise extending areas having recurrent long loop portions with relatively short cut pile portions therebetween, certain of the loop forming fingers may be provided with a relatively short blade or knife on the free end thereof, such as is indicated at 493 in Figure 26. The blade 493 is suitably secured to one side of the nose portion 300b of the corresponding loop forming finger 300 and its cutting edge extends upwardly and forwardly at an angle from the upper edge of the nose portion 300b. It should be noted that the uppermost edge of the blade or knife 493 is disposed below the plane of the upper edge of the shank 300a to insure that only the relatively short pile loops formed across the nose portion 300b will be severed thereby while the relatively long loops formed over the shank portion 300a will remain unsevered.

Now, when both the long loops and the short loops formed in any of the elongated warpwise extending areas are to be cut, a relatively long or high blade or knife of the type indicated at 493a in Figure 27 may be suitably secured to the free end of the nose portion 300b of the desired loop forming fingers 300.

It will be noted that the blade or knife 493a in Figure 27 differs from the blade or knife 493 in Figure 26 only to the extent that its upper edge is disposed above the plane of the upper edge of the shank 300a so that all of the relatively long and relatively short loops formed over the respective portions 300a, 300b of the corresponding loop forming fingers 300 will subsequently be severed by the blade or knife 493a.

Referring to Figure 28 there is still another form of severing means illustrated which may be arranged to cooperate with any of the loop forming fingers or wires 300 for cutting or severing only the relatively long loops formed on the corresponding shanks 300a. Thus, elongated warpwise extending areas may be provided in portions of which relatively short loops are disposed and in other portions of which relatively long cut pile tufts are disposed. The long loop severing means shown in Figure 28 is similar to the finger guide means shown in Figures 4 and 5 of said Clark Patent No. 2,437,378.

In the form of severing means shown in Figure 28, a plurality of circular cutting blades or disks 493b, only one of which is shown, are mounted on a transverse shaft 494 spaced above the breast plate 56 and supported in blocks 495 at opposite ends thereof, only one of which is shown in Figure 28. Each of the blocks 495 is supported on a substantially Z-shaped bracket 496 suitably secured to opposite end portions of the breast plate 56.

One of the cutting disks or circular knives 493b may be disposed in touching engagement with the shank 300a of each of the desired loop forming fingers or wires 300, or each of the fingers 300, whose long loops formed thereon are to be severed, may be provided with a groove 300d in the shank 300a thereof at its juncture with the nose portion 300b, and in which the lower portion of the corresponding cutting disk 493b may be positioned to thus sever the long loops only subsequent to formation thereof over the shank 300a of the corresponding loop forming finger or wire 300.

It is preferable that each of the blocks 495 is adjustably secured to the uprising portion of the corresponding Z-shaped bracket 496 by means of a bolt 497 which slidably penetrates an adjustment slot 498 provided therefor in the upright portion of the corresponding Z-shaped bracket 496 and which bolt 497 is threadably embedded in the corresponding block 495. In order to accurately predetermine the position of the blades 493b relative to the corresponding loop forming fingers 300, each of the blocks 495 is engaged by an adjustment screw 499 which is threadably embedded in the corresponding block 495, slidably penetrates the horizontal upper portion of the bracket 496 and is restrained from vertical movement in the bracket 496 by means of collars 499a fixed on the bolt 499 and engaging the upper and lower surfaces of the upper horizontal portion of the corresponding bracket 496.

Although the blade 493b is shown as being circular or in the form of a disk, it is to be distinctly understood that any desired shape of blade may be employed, such as a hook-shaped blade which will engage and sever only the long loops as they are formed over the shanks 300a of the desired loop forming fingers 300.

It is thus seen that I have provided means whereby warpwise extending areas of the fabric, or the entire width thereof may be provided with warpwise spaced cut pile portions which are either relatively long or relatively short with loop pile portions therebetween which are respectively relatively short or relatively long and also wherein both the recurrent relatively long cut pile portions and relatively short cut pile portions may be provided by using the required type of severing means shown in Figures 26, 27 or 28. Of course, these different types of severing means may also be used in combination to form various types of loop pile or cut pile warpwise extending areas in parallel or weftwise spaced relationship, as desired.

A few examples of the many different loop pattern designs which may be produced by means of the pattern controlled loop forming fingers 300 incorporated in a loom for weaving a base fabric, and having loop forming yarn guides for looping the pile yarns over the loop forming fingers are shown in Figures 17 to 22, inclusive. It will be noted that the piece of fabric shown in Figure 17 includes warpwise rows of spaced recessed areas 500 which are also spaced weftwise from each other and are formed from relatively short loops. Solid cut pile areas 501 are formed between and surround the recessed areas 500 formed from the relatively short loops.

However, in this instance, the cut pile areas are initially formed as relatively long loops which may be severed during the weaving operation, by means of the severing means shown in Figure 28, or the long loops may be severed by means of a suitable shearing apparatus after the fabric has been taken from the loom. Also, it should be noted in Figure 17 that the recessed areas 500 each include two warpwise extending rows of loops, in which instance each of the groups D', C', C" and D" of fingers 300 in Figure 10 would include two fingers 300 instead of three as shown, with corresponding changes being made in the location of the washers 372, 392 of the pattern mechanism 368 in the usual manner.

If the recessed areas 500 are formed in rows extending warpwise throughout the length of the fabric with warpwise rows of cut pile between adjacent rows of relatively short or long loops, then either of the severing means shown in Figure 26 or 27 could be provided on the loop forming fingers employed in forming the cut pile rows. Of course, the blade 493 in Figure 26 would sever those loops formed over the nose portions 300b, but the blade 493a in Figure 27 would sever loops formed over either or both the shanks 300a and the nose portions 300b of the corresponding fingers 300.

It is also contemplated that by the means last described, warpwise extending rows of cut pile may be provided throughout the length of the fabric between which rows of loops could be formed wherein certain of the loops could be relatively long and others of the loops could be relatively short.

In Figures 18 to 22, inclusive, pieces of fabric are shown schematically in which the shaded areas may represent the areas formed from relatively short loops and the unshaded areas may represent the areas formed from relatively long loops, or vice versa, by varying the positions of the washers 372 and 492 on the respective chains 371 and 491 and by varying the number of pile loop forming fingers 300 in each group and in each series of groups which are locked in engagement with a selected one of the finger holding and guiding bars 301, 302, 303 and 304.

Of course, the loops in opposite ends of each of the recessed areas may gradually increase in length according to the manner in which the loops are illustrated in Figure 16 and in which instance, each of the fingers would be provided with the inclined upper surface portion 300c (Figure 13) thereon, or the relatively short loops in each of the recessed areas may be of the same length throughout the length of each of said recessed areas with relatively long loops of the same length throughout the length of each of the raised or embosed areas therebetween. In the latter instance, the inclined upper surface portions 300c will then be omitted and the shanks 300a of the corresponding loop forming fingers 300 would be cut perpendicular at the junctures thereof with the nose portions 300b, as shown in Figure 25.

The piece of fabric shown in Figure 18 includes relatively broad warpwise and weftwise extending rows of substantially square or rectangular long-loop, raised or embossed areas 504 between each warpwise row or which an elongated warpwise extending recessed or short-loop line or area 505 is formed.

The raised, embossed or cut pile areas 504 define weftwise extending recessed or short-loop lines or areas 506 which extend throughout the width of the fabric. In this instance, the relatively long loops initially formed in the substantially rectangular or square areas 504 may be severed, either by the means shown in Figure 28 during the weaving operation or by means of a suitable shearing apparatus, after the fabric is woven and has been taken from the loom. If so desired, each of the substantially rectangular areas 504 may include twenty-seven relatively high loops or long loops warpwise of the fabric and twenty-seven relatively long loops weftwise of the fabric and each of the longitudinally extending recessed areas 505 may include six warpwise extending rows of relatively short loops. The weftwise extending recessed lines or areas 506 may each include six weftwise extending rows of relatively short loops.

Of course, the relatively short loops in the recessed areas or lines 505, 506 would be formed by looping the pile yarn over the relatively narrow nose portions 300b or 610b of the corresponding loop forming fingers 300 or 610 and the relatively long loops initially formed in each of the areas 504 would be looped over the relatively high portions or shanks 300a or 610a of the respective loop forming fingers 300 or 610. The fingers 610 and portions 610a, 610b, 610c thereof (Figure 4–B) correspond to fingers 300 and the respective portions 300a, 300b, 300c and will be later described.

It is apparent that, in weaving the fabric shown in Figure 18, the warpwise extending portions of the fabric embraced by the rectangular or square embossed areas 504 could be formed by attaching the loop forming fingers alined with these particular areas during the weaving operation to a single one of the bars 301, 302, 303 or 304 (Figure 13) while the loop forming fingers employed in forming the relatively short loops in each of the warpwise extending lines 505 could be attached to another of said finger holding and guiding bars, with the washers 492, 372 on the respective chains 491, 371 (Figures 5, 6 and 9) being arranged accordingly.

In weaving the piece of fabric shown in Figure 19, each weftwise repeat includes four warpwise extending rows of recurrent long-loop and short-loop or raised and recessed areas, the group of rows of loops of varying height in each weftwise repeat being indicated at 507, 508, 509 and 510. The width of the row 507 is substantially twice the width of each of the rows 508, 510 and the row 509 is substantially one-fourth the width of each of the rows 508, 510. Each warpwise repeat in each of the rows 507 includes successively formed areas 513, 514, 515, and 516, each warpwise repeat in each of the rows 508, 510 includes successively formed areas 517, 518, 519 and 520 and each warpwise repeat in the row 509 includes successively formed areas 525, 526, 527 and 528.

In this instance, each of the areas 516, 520, 528, is twice the warpwise length of each of the areas 513, 515, 517, 519, 525, 527, and each of the areas 514, 518, 526 is one-fourth the warpwise length of the adjacent areas 513, 515, 517, 519, 525, 527. The shaded areas 514, 516, 517, 519, 526, 528 are preferably initially formed with relatively long loops while the remaining areas are formed with relatively short loops. Of course, if so desired, the long-loop areas may also be cut before or after the fabric is taken from the loom.

As one example of the manner in which the fabric shown in Figure 19 may be woven, each of the warpwise extending rows 507 may embrace twenty-four warpwise extending rows of loops, each of the warpwise extending rows 508, 510 may embrace twelve warpwise extending rows of loops and each of the rows 509 may embrace three warpwise extending rows of loops. Also, each of the areas 516, 520, 528 may embrace twenty-four weftwise extending rows of loops, each of the areas 513, 515, 517, 519, 525, 527 may embrace twelve weftwise extending rows of loops and each of the areas 514, 518, 526 may embrace three weftwise extending rows of loops to produce a symmetrical pattern.

Figure 20:
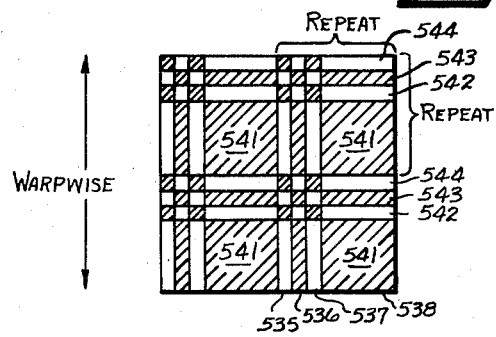

Each weftwise repeat in the fabric shown in Figure 20 includes four warpwise extending lines or rows of recurrent short-loop and long-loop areas, the warpwise rows in each repeat being indicated at 535 to 538, inclusive, and wherein each warpwise repeat in each of the rows 535, 536, 537 and 538 includes successively formed areas 541, 542, 543 and 544.

It is to be assumed that the shaded areas are at least initially formed with relatively long loops and the unshaded areas are formed with relatively short loops. In this instance, each of the rows 535, 536, 537 may include four warpwise extending rows of loops and each of the rows 538 may embrace nineteen warpwise extending rows of loops. Each of the areas 541 may embrace nineteen weftwise extending rows of loops and each of the areas 542, 543, 544 may embrace four weftwise extending rows of loops.

Figure 21:
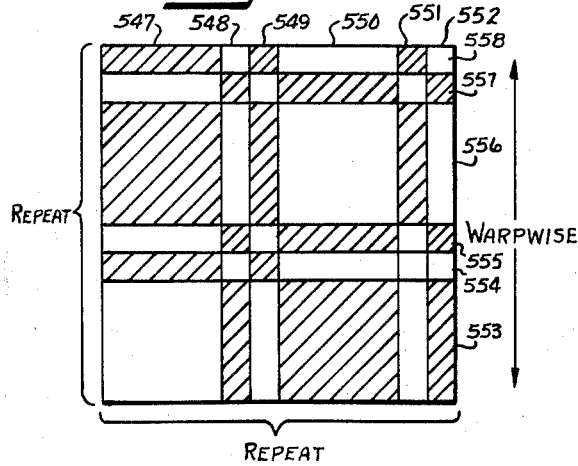

The piece of fabric shown in Figure 21 embraces only a single warpwise repeat and a single weftwise repeat. The weftwise repeat of the fabric shown in Figure 21 includes six warpwise extending rows of recurrent short-loop and long-loop areas 547 to 552, inclusive, and the warpwise repeat in each of the rows 547 to 552, inclusive, includes six areas 553 to 558, inclusive, wherein the shaded areas also are formed with relatively long loops and the unshaded areas are formed with relatively short loops. Each of the warpwise rows 547, 550 embraces nineteen warpwise extending rows of loops and each of the warpwise rows of design areas 548, 549, 551, 552 may embrace four warpwise extending rows of loops. Each of the areas 553, 556 may embrace nineteen weftwise extending rows of loops and each of the areas 554, 555, 557, 558 may embrace four weftwise extending rows of loops.

Figure 22:
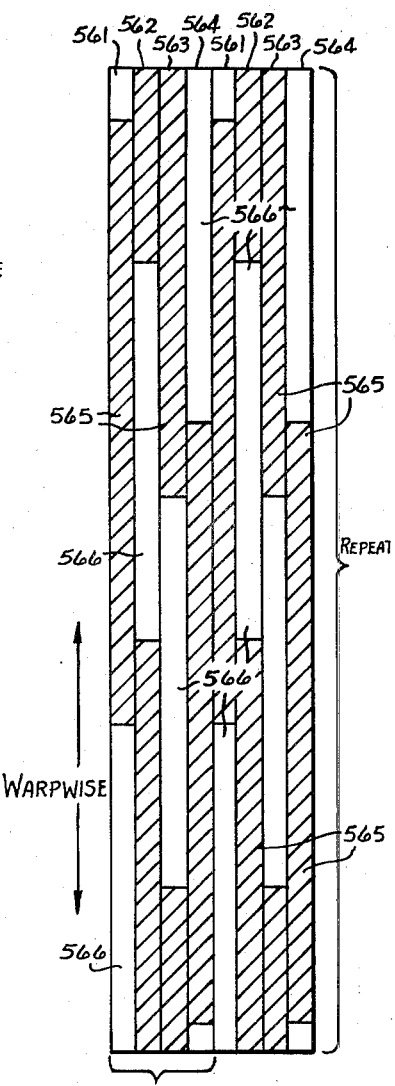

The fabric shown in Figure 22 is similar to that shown in Figure 17 in that each repeat includes warpwise extending rows of recurrent long-loop and short-loop areas, with the exception that the rows of recurrent short-loop and long-loop areas are disposed contiguous to each other.

The rows of areas in each weftwise repeat are indicated at 561 to 564, inclusive, and each of these rows of areas 561 to 564, inclusive, may embrace two warpwise extending rows of loops. Each of the rows of areas 561, 562, 563, 564 includes at least one high or long-loop area 565 and at least one low or short-loop area 566. It should be noted that the proximal ends of adjacent long-loop areas 565 in row 562 overlap the distal ends of the adjacent long-loop area 565 in the row 561. The lower end of the uppermost long-loop area 565 in row 563 terminates substantially midway of the short-loop area 566 in row 562 and the upper end of the lowermost long-loop area 565 in row 563 terminates substantially midway of the adjacent long-loop area 565 in row 562. On the other hand, opposite ends of the long-loop area 565 in row 564 overlap the proximal ends of the adjacent long-loop areas 565 in row 563.

Thus, opposite ends of the high or long-loop areas 565 in each of the rows 561 to 564, inclusive, are disposed in staggered relationship to opposite ends of the other of the high loop or embossed areas 565 in the other rows in each weftwise repeat. It is apparent that either the high loops or the short loops or both in each of the forms of fabric shown in Figures 18 to 22, inclusive, may be severed by the aplicable form of severing means shown in one of the Figures 26, 27 or 28. Also, the high or long loops only in each form of fabric shown in Figures 18 to 22, inclusive, may be severed on a suitable shearing machine, if desired, after the fabric is removed or taken from the loom, without severing the loops in the corresponding recessed areas in the manner described for producing the fabric illustrated in Figure 17.

It is apparent that many other different types of variant-height loop patterns may be produced by varying the number of groups of loop forming fingers 300 attached to each of the finger holding and guiding bars 301, 302, 303 and 304 and by varying the number of loop forming fingers in each of said groups. Of course, corresponding changes in the arrangement of the projections or washers 372, 492 on the respective pattern chains 371, 491 would be required and, in some instances, it is apparent that it is possible to produce various types of patterns merely by varying the positions of the washers 372 and 492 on the respective chains 371, 491, without varying the number of loop forming fingers in each group and without varying the number of groups of loop forming fingers carried by each of the finger holding and guiding bars 301, 302, 303 and 304 in a given width of fabric.

Also, fancy loop patterns, formed from pile loops of varying height may be produced by individually controlling the loop forming fingers and the tension in the strands of pile yarn as exemplified by the structure shown in Figure 4–B.

In order to produce more fancy and irregularly-shaped loop or cut pile design areas in the shape of various objects, such as animals, flowers, buildings, landscape scenes, and the like in relief in practicing the principles of the present invention, a modified form of loop forming finger and control and supporting means therefor is shown somewhat schematically in Figure 4–B, and in association with which the modified form of pile yarn tension compensating means is preferably employed, as shown.

The modified form of loop forming apparatus shown in Figure 4–B differs primarily from that shown in Figure 4–A in that the loop forming finger holding and guiding bars and the operating mechanism therefor, are omitted and, therefore, those parts in Figure 4–B which are identical or substantially the same as the parts shown in Figure 4–A shall bear the same reference characters in order to avoid repetitive description.

In the modified form, shown in Figure 4–B, a plurality of spaced loop forming fingers 610 are provided which form a row extending weftwise of the loom and which fingers 610 may be identical to the fingers 300 of the first or original form shown in Figures 4–A, 10 and 13, with the exception that the loop forming fingers 610 in Figure 4–B need not have the notches therein, such as the notches 307 in Figure 11.

The modified fingers 610 each includes an elongated shank 610a, a narrow nose portion 610b rounded or tapered at its free end, and an inclined upper surface portion 610c. The portions of the loop forming fingers 610 adjacent the reed 40 are mounted for sliding movement in the bar 309, but instead of forwardly and rearwardly shiftable finger holding and guiding bars of the type shown in Figure 10 and indicated at 301 to 304, inclusive, being used, the rear portions of the shanks 610a of the loop forming fingers 610 are mounted for forward and rearward sliding movement in finger guide bars 611 and 612 which are stationary and opposite ends of which are each fixed to a bracket 613 suitably secured to the angularly disposed frame members 251 and 252, only the frame member 251 being shown in Figure 4–B.

Each of the guide bars 611 and 612 has a suitable cap 614 fixed thereon and extending longitudinally thereof for maintaining the shanks of the loop forming finger 610 in the grooves provided therefor in the guide bars 611 and 612. The shank 610a of each of the loop forming fingers 610 preferably has a suitable stop or upwardly projecting portion 615 thereon which is adapted to engage the corresponding cap 614 to limit forward movement of the corresponding fingers 610.

The upper surfaces of the shank 610a, the nose portion 610b and the inclined upper surface portion 610c cooperate with the loop forming guide fingers 245 in forming loops from the pile yarn in identically the manner heretofore described with respect to the fingers 300. Each of the loop forming fingers 610 is urged forwardly by a suitable spring means shown in the form of a tension spring 617, one end of which is connected to the shank 610a and the other end of which is connected to either of the guide bars 611 or 612.

In order to control the forward and rearward movement of the modified form of loop forming fingers 610, each of the fingers, or each of spaced or adjacent groups thereof has a cord or cable 620 attached to the rear end of its shank or shanks and these cables 620 extend rearwardly and pass partially around an idler roll or rod 621 mounted in brackets 622, only one of which is shown in Figure 4–B, and which brackets 622 are carried by the superstructure 74. The cables 620 then extend upwardly from the roll or rod 621 and are connected to a suitable pattern mechanism shown schematically in Figure 4–B and being generally designated at 623.

The pattern mechanism 623 may be of any desired or conventional construction, such as a Knowles head motion, a dobby or a Jacquard mechanism of the usual type, for controlling the cords 620 according to a predetermined pattern, independently of each other. The particular loop forming finger 610 shown in Figure 4–B is shown in withdrawn position and, it is apparent that upon the cord or cable 620 being permitted to move downwardly from the pattern mechanism 623, the springs 617 will cause the corresponding loop forming fingers 610 to advance at the same rate as that at which the fabric is taken up to position the shanks thereof in loop forming position to form relatively long loops while selected adjacent loop forming fingers may remain in the withdrawn position, in which the finger 610 is shown in Figure 4–B, for forming relatively short loops.

It follows, therefore, that all of the loop forming fingers 610 may be independently controlled by the pattern mechanism 623 for forming relatively short and relatively long loops throughout the width of the fabric in any desired combination. Of course, depending upon the particular form of pattern to be formed from relatively long and relatively short loops, it may be desirable to provide a separate let-off means for each of the strands of pile yarn, with each of the pile yarns being taken from a separate spool and the individual let-off means being controlled by the pattern mechanism 623 or a separate pattern mechanism, according to the desired pattern.

However, in forming many different types of patterns, the let-off mechanisms shown in Figures 4–A and 4–B will serve satisfactorily in combination with either the pile yarn tension compensating means shown in Figure 4–A or the pile yarn tension compensating means shown in Figure 4–B, or it may be desirable, in some instances, to combine the two forms of tension compensating means shown in Figures 4–A and 4–B.

It is also contemplated that, by taking the pile yarn from spools or from a creel, adjacent yarns may be of different texture or color in order to produce a variegated pattern as well as a recessed or embossed pattern formed from pile loops of a varying length or cut pile areas of varying height. In forming some types of loop patterns it may be desirable to provide both types of loop forming fingers 300, 610 and the corresponding pattern control means therefor in combination.

It is thus seen that I have provided an improved method of, and apparatus for, producing pile fabrics in which spaced design areas of any desired shape or size may be formed weftwise and warpwise of the fabric from different lengths of loops or cut pile than the areas therebetween and, also, whereby spaced portions of the fabric may be provided with cut pile and other portions provided with pile loops of constant or varying length, as desired. In the latter instance the pile loops may be shorter or longer than the cut pile. The severing means shown in Figures 26, 27 and 28 may also be used with the fingers or wires 610 in the same manner as that described for the fingers or wires 300, when and if desired.

In the drawings and specification there has been set forth preferred embodiments of the invention and although specific terms are employed, they are used in a generic and descriptive sense only, and not for purposes of limitation, the scope of the invention being defined in the claims.

I claim:

1. In a loom for weaving pile fabrics, said loom having means for making a base fabric including a reed and additional means for forming loops from pile yarns over longitudinal loop forming fingers; the combination therewith of a series of spaced warpwise extending loop forming fingers mounted on the loom and each having upper surface portions of at least two different levels thereon and disposed adjacent the fell of the fabric being woven, and means for selectively shifting the fingers warpwise to alternately position the two different levels of upper surface portions in pile loop forming position to form loops of varying height according to a predetermined pattern as the fabric is woven.

2. In a loom for weaving pile fabrics, said loom having means for making a base fabric including a reed and additional means for forming loops from pile yarns over longitudinal loop forming fingers; the combination therewith of a series of spaced warpwise extending fingers mounted on the loom and each having upper surface portions of at least two different levels thereon, and means for selectively shifting the fingers longitudinally of the warp to selectively position the two different levels of upper surface portions in pile loop forming position as the fabric is woven.

3. In a loom for weaving pile fabrics, said loom having movable pile yarn guides thereon instrumental in forming pile loops from strands of pile yarn; the combination of a series of spaced warpwise extending fingers mounted on the loom and each having upper surface portions of at least two different levels thereon and means for selectively shifting the fingers longitudinally of the warp adjacent said guides to selectively position the different levels of upper surface portions in pile loop forming position to successively form loops of varying length according to a predetermined pattern as the fabric is woven.

4. In a loom for weaving pile fabrics, said loom having movable pile yarn guides thereon instrumental in forming pile loops from strands of pile yarn; the combination of a series of spaced warpwise extending fingers mounted on the loom and each having upper surface portions of at least two different levels thereon, means for selectively shifting the fingers longitudinally of the warp adjacent said guides to selectively position the different levels of upper surface portions in pile loop forming position to successively form loops of varying length according to a predetermined pattern as the fabric is woven, means for feeding the strands of pile yarn to said guides at a substantially uniform rate, and independent means interposed between the feeding means and said guides to take up the slack in each of said strands when relatively short loops are formed over any of the fingers following the formation of relatively long loops over the latter fingers.

5. In a loom for weaving pile fabrics, said loom having means for making a base fabric including a reed and additional means for forming loops from pile yarns over longitudinal loop forming fingers; the combination therewith of a series of spaced warpwise extending fingers mounted on the loom and each having upper surface portions of different levels on the free ends thereof and disposed adjacent the fell of the fabric being woven, and means for selectively shifting the fingers longitudinally of the warp to selectively position the different levels of upper surface portions in pile loop forming position to successively form loops of varying length, according to a predetermined pattern, as the fabric is woven.

6. In a loom for weaving pile fabrics, said loom having a series of spaced fingers having their front portions mounted on the loom forward of the harnesses and extending parallel with the warp, said loom also having a series of pile yarn feeding guides for feeding pile yarns across the fingers and into and out of the warp for looping the pile yarn over the spaced fingers; the combination of a relatively high shank and a relatively low nose portion formed on each of said spaced fingers, and pattern controlled means for alternately shifting the shank portions and the nose portions of selected spaced fingers into and out of loop forming position to form loops of varying length, as the fabric is woven, in accordance with a predetermined pattern.

7. In a loom for weaving pile fabrics, the combination with a movable beating means and a series of spaced pile yarn feeding guides through which strands of pile yarn are threaded and being shiftable laterally above and forwardly of the beating means and vertically into and out of the warp; of a series of spaced loop forming fingers mounted on the loom and extending parallel with the warp, each of said fingers having at least two alined upper edge portions of different heights on its free end, and pattern controlled means for selectively varying the position of certain of said fingers independently of the others to selectively position the alined upper edge portions thereon beneath the pile yarn feeding guides whereby the pile yarn is looped over each of the alined upper edge portions of the fingers independently of the other upper edge portion to form loops of varying length corresponding to the height of the upper edge portions as the fabric is woven.

8. In a loom for weaving pile fabrics, the combination with a beating means and a series of vertically and laterally shiftable spaced pile yarn feeding guides through which strands of pile yarn are threaded; of a transverse row of spaced warpwise extending loop forming fingers each having a shallow nose portion on its free end and a relatively high shank portion extending rearwardly from each nose portion, each of said nose portions and said shank portions being alternately movable into operating relationship with the pile yarn feeding guides forwardly of the beating means, and pattern controlled means for selectively shifting the nose portions and the shank portions of predetermined fingers warpwise into and out of loop forming position for producing a predetermined pattern of loops of varying length.

9. In a loom for weaving pile fabrics, the combination with a beating means and a series of vertically and laterally shiftable spaced pile yarn feeding guides through which strands of pile yarn are threaded; of a weftwise row or spaced warpwise extending loop forming fingers each having a shallow nose portion on its free end and a relatively high shank portion extending rearwardly from each nose portion, each of said nose portions and said shank portions being alternately movable into operating relationship with the pile yarn feeding guides forwardly of the beating means, pattern controlled means for selectively shifting the nose portions and the shank portions of predetermined fingers warpwise into and out of loop forming position for producing a predetermined pattern of loops of varying length, means for letting off at least some of said strands to the guides at a substantially uniform rate, and means for independently maintaining each of said strands under tension as the size of the loops formed therefrom vary with shifting of the corresponding finger.

10. In a loom for weaving pile fabrics, the combination with a beating means and a series of spaced pile yarn feeding guides through which strands of pile yarns are threaded and being shiftable transversely above and forwardly of the beating means and vertically into and out of the warp; of a series of spaced loop forming fingers mounted on the loom and extending parallel with the warp, each of said fingers having a relatively low upper edge portion on its free end and a relatively high upper edge portion disposed adjacent and in alinement with said relatively low upper edge portion, pattern controlled means for varying the relative positions of said fingers to selectively position the relatively low upper edge portions and the relatively high upper edge portions of the fingers beneath the pile yarn feeding guides whereby the pile yarn is looped over the relatively low and relatively high upper edge portions of the fingers to form loops of varying height as the fabric is woven.

11. In a loom for weaving pile fabrics, the combination with a beating means and a series of spaced pile yarn feeding guides through which strands of pile yarns are threaded and being shiftable transversely above and forwardly of the beating means and vertically into and out of the warp; of a series of spaced loop forming fingers mounted on the loom and extending parallel with the warp, each of said fingers having a relatively low upper edge portion on its free end and a relatively high upper edge portion disposed adjacent and in alinement with said relatively low upper edge portion, and means for varying the position of each of said fingers independently of the others to alternatively position the relatively low upper edge portions and the relatively high upper edge portions of the fingers beneath the pile yarn feeding guides whereby the pile yarn is looped over the relatively low and relatively high upper edge portions of the fingers to form loops of varying height corresponding to the height of the upper edge portions.

12. In a loom for weaving pile fabrics, the combination wtih a beating means and a series of spaced pile yarn feeding guides disposed forwardly of the beating means and through which strands of pile yarns are threaded and said guides being shiftable transversely above the beating means and vertically into and out of the warp; of a series of spaced loop forming fingers mounted on the loom and extending parallel with the warp, each of said fingers having a relatively low upper edge portion on its free end and a relatively high upper edge portion disposed adjacent and in alinement with each of said relatively low upper edge portions, pattern controlled means for selectively varying the position of some of said fingers independently of others to selectively position the relatively low upper edge portions and the relatively high upper edge portions of the fingers beneath the pile yarn feeding guides whereby the pile yarn is looped over the relatively low and relatively high upper edge portions of the fingers to form loops of varying height corresponding to the height of the upper edge portions as the fabric is woven.

13. In a loom for weaving pile fabrics, the combination with a beating means and a series of vertically and laterally shiftable spaced pile yarn feeding guides through which strands of pile yarn are threaded; of a transverse row of spaced warpwise extending loop forming fingers each having a shallow nose portion on its free end and a relatively high shank portion extending rearwardly from each nose portion, each of said nose portions and said shank portions being alternately movable into operating relationship with the pile yarn feeding guides forwardly of the beating means, said loop forming fingers being divided into series and each series including spaced groups of said fingers, a plurality of forwardly and rearwardly shiftable finger holding and guiding bars disposed transversely of the loom and rearwardly of said beating means and in which the shank portions of said fingers are loosely mounted, means attaching each of said series of fingers to a separate one of said finger holding and guiding bars, and means for shifting at least one of said finger holding and guiding bars to and fro to shift the corresponding series of fingers to and fro and to thereby alternately shift the nose portions and the shank portions of the corresponding fingers into and out of loop forming position.

14. In a loom for weaving pile fabrics, the combination with a beating means and a series of vertically and laterally shiftable spaced pile yarn feeding guides through which strands of pile yarn are threaded; of a transverse row of spaced warpwise extending loop forming fingers each having a shallow nose portion on its free end and a relatively high shank portion extending rearwardly from each nose portion, each of said nose portions and said shank portions being alternately movable into operating relationship with the pile yarn feeding guides forwardly of the beating means, said loop forming fingers being divided into a plurality of series and each series including spaced groups of said fingers, a plurality of forwardly and rearwardly shiftable finger holding and guiding bars disposed transversely of the loom and rearwardly of said beating means and in which the shank portions of said fingers are loosely mounted, means attaching each of said series of fingers to a separate one of said finger holding and guiding bars, means for shifting at least one of said finger holding and guiding bars to and fro to shift the corresponding series of fingers to and fro and to thereby alternately shift the nose portions and the shank portions of the corresponding finger into and out of loop forming position, means for letting off said strands of pile yarn at a substantially uniform rate, and means for maintaining those strands corresponding to each of the series of fingers under tension as the size of the loops vary with shifting of said finger holding and guiding bar.

15. In a loom for weaving pile fabrics, the combination with a beating means and a series of vertically and laterally shiftable spaced pile yarn feeding guides through which strands of pile yarn are threaded; of a transverse row of spaced warpwise extending loop forming fingers each having a shallow nose portion on its free end and a relatively high shank portion extending rearwardly from each nose portion, each of said nose portions and said shank portions being alternately movable into operating relationship with the pile yarn feeding guides forwardly of the beating means, said loop forming fingers being divided into a plurality of series and each series including spaced groups of at least one finger each, a plurality of forwardly and rearwardly shiftable finger holding and guiding bars disposed transversely of the loom and rearwardly of said beating means and in which the shank portions of said fingers are loosely mounted, means attaching each of said series of fingers to a separate one of said finger holding and guiding bars, and means for selectively shifting each of said finger holding and guiding bars to and fro to shift the corresponding series of fingers to and fro and to thereby alternately shift the nose portions and the shank portions of the corresponding fingers into and out of loop forming position.

16. In a loom for weaving pile fabrics, the combination with a beating means and a series of vertically and laterally shiftable spaced pile yarn feeding guides through which strands of pile yarn are threaded; of a transverse row of spaced warpwise extending loop forming fingers each having a shallow nose portion on its free end and a relatively high shank portion extending rearwardly from each nose portion, each of said nose portions and said shank portions being alternately movable into operating relationship with the pile yarn feeding guides forwardly of the beating means, said loop forming fingers being divided into a plurality of series and each series including spaced groups of at least one finger each, a plurality of forwardly and rearwardly shiftable finger holding and guiding bars disposed transversely of the loom and rearwardly of said beating means and in which the shank portions of said fingers are loosely mounted, means attaching each of said series of fingers to a separate one of said finger holding and guiding bars, a separate cam means for shifting each of said finger holding and guiding bars to and fro to shift the corresponding series of fingers to and fro and to thereby alternately shift the nose portions and the shank portions of the corresponding fingers into and out of loop forming position, and pattern controlled means for selectively imparting movement to each of said cam means for producing a predetermined pattern of loops of varying length.

17. In a loom for weaving pile fabrics, the combination with a beating means and a series of vertically and laterally shiftable spaced pile yarn feeding guides through which strands of pile yarn are threaded; of a transverse row of spaced warpwise extending loop forming fingers each having a shallow nose portion on its free end and a relatively high shank portion extending rearwardly from each nose portion, each of said nose portions and said shank portions being alternately movable into operating relationship with the pile yarn feeding guides forwardly of the beating means, said loop forming fingers being divided into a plurality of series and each series including spaced groups of at least one finger each, a plurality of forwardly and rearwardly shiftable finger holding and guiding bars disposed transversely of the loom and rearwardly of said beating means and in which the shank portions of said fingers are loosely mounted, means attaching each of said series of fingers to a separate one of said finger holding and guiding bars, a separate cam means for shifting each of said finger holding and guiding bars to and fro to shift the corresponding series of fingers to and fro and to thereby alternately shift the nose portions and the shank portions of the corresponding fingers into and out of loop forming position, pattern controlled means for selectively imparting movement to each of said cam means for producing a predetermined pattern of loops of varying length, means, interposed between said pattern means and each of said cam means, for driving the cam means comprising a ratchet wheel fixed to each cam means, a driven reciprocating ratchet pawl for each ratchet wheel, and said pattern means being operable to shift each ratchet pawl into and out of engagement with its corresponding ratchet wheel.

18. In a loom for weaving pile fabrics, the combination with a beating means and a series of vertically and laterally shiftable spaced pile yarn feeding guides through which strands of pile yarn are threaded; of a transverse row of spaced warpwise extending loop forming fingers each having a shallow nose portion on its free end and a relatively high shank portion extending rearwardly from each nose portion, each of said nose portions and said shank portions being alternately movable into operating relationship with the pile yarn feeding guides forwardly of the beating means, said loop forming fingers being divided into a plurality of series and each series including spaced groups of at least one finger each, a plurality of forwardly and rearwardly shiftable finger holding and guiding bars disposed transversely of the loom and rearwardly of said beating means and in which the shank portions of said fingers are loosely mounted, means attaching each of said series of fingers to a separate one of said finger holding and guiding bars, means for selectively shifting each of said finger holding and guiding bars to and fro to shift the corresponding series of fingers to and fro and to thereby alternately shift the nose portions and the shank portions of the corresponding fingers into and out of loop forming position, means for directing said strands of pile yarn from a suitable source to the pile yarn feeding guides comprising at least one let-off mechanism for letting off the pile yarns from said source, said pile yarns being divided into series each corresponding to a separate one of said series of loop forming fingers, and a separate tension compensating means interposed between the let-off means and the pile yarn feeding guides for each of the series of pile yarns to thereby separately maintain each series of pile yarns under tension and to take up the slack therein as the rate at which the strands of pile yarns in each series are taken up varies in accordance with the length of the loops formed therefrom over the nose portions and shank portions of the corresponding series of loop forming fingers.

19. In a loom for weaving pile fabrics, the combination with a beating means and a series of vertically and laterally shiftable pile yarn feeding guides normally spaced above and forwardly of the beating means; of a series of spaced fingers extending parallel with the warp, each finger having an elongated shank portion of given height and a relatively narrow nose portion of lesser height on its free end and being movable into and out of loop forming relationship with said guides, certain of said fingers being divided into first spaced groups and certain others of said fingers defining second spaced groups interspersed with said first spaced groups, first and second forwardly and rearwardly shiftable finger holding and guiding bars spaced rearwardly of said beating means and in which the shank portions of said fingers are loosely mounted, means attaching each of the fingers in the first groups to the first finger holding and guiding bar, means attaching the shank portions of the second groups of fingers to the second finger holding and guiding bar, cam means for shifting each of said finger holding and guiding bars and its corresponding fingers to and fro to alternately position the nose portions and the shank portions of the corresponding fingers in loop forming relationship with said pile yarn feeding guides, and pattern controlled means for imparting movement to each of said cam means independently of the other to produce a predetermined pattern of relatively short and relatively long pile loops as the nose portions and the shank portions of the corresponding fingers are alternately moved into operating relationship with the pile yarn feeding guides.

20. In a loom for weaving pile fabrics, the combination with a beating means and a series of spaced pile yarn feeding guides through which strands of pile yarns are threaded and being shiftable transversely above and forwardly of the beating means and vertically into and out of the warp; of a series of spaced loop forming fingers mounted on the loom and extending parallel with the warp, each of said fingers having a relatively low upper edge portion on its free end and a relatively high upper edge portion disposed adjacent and in alinement with said relatively low upper edge portion, means for varying the position of each of said fingers independently of the others to alternatively position the relatively low upper edge portions and the relatively high upper edge portions of the fingers beneath the pile yarn feeding guides whereby the pile yarn is looped over the relatively low and relatively high upper edge portions of the fingers to form loops of varying height corresponding to the height of the upper edge portions, means for directing said strands of pile yarn to the guides from a source comprising at least one let-off for said strands for letting off the strands from said source, said strands being divided into a plurality of series, each series forming a plurality of groups of strands, pile yarn tension compensating means comprising a plurality of horizontally spaced substantially parallel lease rods extending transversely of the loom and spaced substantially above said pile yarn feeding guides, each of said series of pile strands successively passing from the let-off means above a separate one of said lease rods and then downwardly and then upwardly over the next adjacent of said lease rods and thence to the pile yarn feeding guides, and a tension compensating shaft resting upon the portion of each of said series of pile yarn strands depending between adjacent lease rods for maintaining the corresponding series of pile yarn strands under tension.

21. In a loom for weaving pile fabrics, the combination with a beating means and a series of spaced pile yarn feeding guides through which strands of pile yarns are threaded and being shiftable transversely above and forwardly of the beating means and vertically into and out of the warp; of a series of spaced loop forming fingers mounted on the loom and extending parallel with the warp, each of said fingers having a relatively low upper edge portion on its free end and a relatively high upper edge portion disposed adjacent and in alinement with said relatively low upper edge portion, means for varying the position of each of said fingers independently of the others to alternatively position the relatively low upper edge portions and the relatively high upper edge portions of the fingers beneath the pile yarn feeding guides whereby the pile yarn is looped over the relatively low and relatively high upper edge portions of the fingers to form loops of varying height corresponding to the height of the upper edge portions, means for directing said strands of pile yarn to the guides from a source comprising at least one let-off for said strands for letting off the strands from said source, said strands being divided into series, each series forming a plurality of groups of strands, pile yarn tension compensating means comprising a plurality of horizontally spaced substantially parallel lease rods extending transversely of the loom and spaced substantially above said pile yarn feeding guides, each of said series of pile strands successively passing from the let-off means above a separate one of said lease rods and then downwardly and then upwardly over the next adjacent of said lease rods and thence to the pile yarn feeding guides, a tension compensating shaft resting upon the portion of each of said series of pile yarn strands depending between adjacent lease rods for maintaining the corresponding series of pile yarn strands under tension, and means partially counterbalancing each of said tension compensating shafts.

22. In a loom for weaving pile fabrics, the combination with a beating means and a series of spaced pile yarn feeding guides through which strands of pile yarns are threaded and being shiftable transversely above and forwardly of the beating means and vertically into and out of the warp; of a series of spaced loop forming fingers mounted on the loom and extending parallel with the warp, each of said fingers having a relatively low upper edge portion on its free end and a relatively high upper edge portion disposed adjacent and in alinement with said relatively low upper edge portion, means for varying the position of each of said fingers independently of the others to alternatively position the relatively low upper edge portions and the relatively high upper edge portions of the fingers beneath the pile yarn feeding guides whereby the pile yarn is looped over the relatively low and relatively high upper edge portions of the fingers to form loops of varying height corresponding to the height of the upper edge portions, pile yarn tension compensating means comprising a plurality of spaced substantially parallel lease rods extending transversely of the loom and spaced substantially above said pile yarn feeding guides, said strands of pile yarn being divided into series and each pile yarn series including a plurality of spaced groups of strands, means for letting off each of said series of pile yarn strands from a source, each of said series of pile yarn strands passing from the let-off means above a separate one of said lease rods and then downwardly and then upwardly over another of said lease rods, to form a loop therein, and thence to the pile yarn feeding guides, a plurality of loop members through each of which the loop formed in at least one of said strands passes in its course between the corresponding lease rods, and a weight member depending from each of said loop members to thereby separately maintain each of the strands of pile yarns in each series under tension.

23. In a loom for weaving pile fabrics, said loom having means for making a base fabric including a reed and additional means for forming loops from pile yarns over longitudinal loop forming fingers; the combination therewith of warpwise extending loop forming fingers mounted on the loom and each having successive upper surface portions of different levels thereon, an inclined upper edge portion connecting adjacent ends of successive upper surface portions of different levels, and means for selectively shifting the successive upper surface portion and the intervening upper edge portion on each of said fingers warpwise into and out of loop forming position to form predeterminedly configured areas of loops of varying length as the fabric is woven.

24. In a loom for weaving pile fabrics having means whereby a base fabric is woven of warp and filler yarns, a series of pile yarn guides for feeding pile yarns and being vertically movable into and out of the shed of the loom and below the path of travel of the filler yarn inserting means and being shiftable laterally when in raised position; the combination of a series of fingers extending warpwise of the loom and in spaced relation with each other fillerwise of the loom, each of at least same of said fingers being provided with stepped portions of different vertical thickness on their free ends, and means for automatically shifting said some of the fingers independently of each other warpwise of the loom to vary the position of the stepped portions alined with said pile yarn guides as the fabric is woven whereby the pile yarns are looped over the fingers and successive loops thus formed are of different lengths.

25. In a method of weaving pile fabrics on a loom wherein a base fabric is woven from warp and filler yarn and pile yarns are interwoven into the base fabric by shogging pile yarns over warpwise extending fingers having upper surface portions of different heights, the step of shifting at least some of said fingers warpwise above the base fabric in the course of continuous weaving to vary the position of corresponding upper surface portions relative to the point at which the yarns are shogged to, thereby vary the length of successive loops formed over said fingers.

26. In a method of weaving pile fabrics on a loom having movable beating means wherein a base fabric of the usual warp and filler threads is woven and pile yarns are concurrently woven into the base fabric by shogging the pile yarns over warpwise extending fingers having upper surface portions of different heights, the step of shifting said fingers warpwise above said base fabric in the course of certain successive operations of the beating means to accordingly vary the height of successive loops formed by shogging pile yarns over the warpwise extending fingers.

27. In a method of weaving in a loom having fingers provided with upper surface portions of different levels and also having means for forming a base fabric and for forming loops across said fingers and tying the same into the base fabric; the steps of advancing certain of said fingers to position one of the upper surface portions thereof in loop forming position and, thereafter shifting said certain of the fingers to position another of said upper surface portions in loop forming position to thereby form loops of varying height according to a predetermined pattern.

28. In a method of weaving pile fabrics on a loom having movable beat-up means wherein a base fabric of the usual warp and filler yarns is woven and pile yarns are concurrently woven into the base fabric by shogging them over warpwise extending fingers and wherein said fingers are of varying height throughout at least a part of their length, the steps of selectively shifting the varying height portions of said fingers forwardly and rearwardly of the point at which the pile yarns are shogged over the warpwise extending fingers to thereby vary the height of loops formed by such shogging of the pile yarns in accordance with a predetermined pattern.

29. In a method of weaving pile fabrics on a loom having movable beating means and wherein warp yarns and filler yarns are woven into a base fabric concurrently with which pile yarns are interwoven with said base fabric, the steps of positioning a plurality of warpwise fingers of given height beneath pile yarns and above the base fabric while shogging said pile yarns over the fingers to form pile loops of a predetermined length, and thereafter shifting said fingers warpwise to position other portions of a greater height than the first-named portions of said fingers between the corresponding pile yarns and the base fabric while shogging pile yarns over said fingers to form at least some pile loops of greater length than the other pile loops.

30. In a method of weaving pile fabrics on a loom having movable beating means and wherein warp yarns and filler yarns are woven into a base fabric concurrently with which pile yarns are interwoven with said base fabric, the steps of positioning a plurality of warpwise fingers of given height beneath pile yarns and above the base fabric while shogging said pile yarns over the fingers to form pile loops of a predetermined length, and thereafter selectively shifting said fingers warpwise to position other portions of a greater height than the first-named portions of said fingers between the corresponding pile yarns and the base fabric while shogging pile yarns over all of said fingers to form at least some pile yarn loops of greater length than the previously formed pile loops.

31. In a method of weaving pile fabrics on a loom having movable beating means and wherein warp yarns and filler yarns are woven into a base fabric concurrently with which pile yarns are interwoven with said base fabric, the steps of positioning variant height portions of a plurality of warpwise fingers beneath pile yarns above the base fabric, shogging said pile yarns over the fingers to form pile loops of different lengths, and thereafter shifting at least some of the fingers warpwise to position other portions of a different height than the first-named portions of said fingers between the corresponding pile yarns and the base fabric, and shogging pile yarns over all of said fingers to form warpwise successive pile yarn loops of different lengths.

32. A method of weaving pile fabrics on a loom having a movable beating means and having warpwise extending fingers each provided with at least two portions of varying height, which comprises arranging warp yarns in parallel groups, interlacing weft yarns with said warp yarns, threading pile yarn over said fingers, and into the warp on each side of each group of warp yarns and in advance of said beating means, placing weft yarn through the loops of pile formed on the fingers and interlacing the latter weft yarn with at least some of the warp yarns while drawing the pile yarn snugly over the fingers and the weft yarn against the under edges of the fingers, inserting a weft yarn and beating up the same directly against one side of the loops of pile yarn, successively varying the position of certain of said fingers warpwise of the loom at times relative to others of said fingers in the course of forming successive loops of pile thereon to thereby form successive areas in which at least one of said areas has different length loops than another of said areas.

33. A method of weaving pile fabrics on a loom having movable beating means which comprises weaving warp and filler yarns into a base fabric and concurrently with the weaving of the base fabric interweaving pile yarn into the fabric by shogging strands of pile yarn over warpwise extending fingers, wherein said fingers have upper surface portions at their free ends of variant height, threading the strands of pile yarn between the fingers and entirely forwardly of the beating means into the shed of the loom below the path of the filler inserting means, inserting filler strands over the pile yarn and through the open shedded warp, again threading the pile yarn upwardly between the fingers, thereby looping the pile yarn around the filler, keeping the pile yarn under tension whereby the loops thus formed are drawn snugly around the fingers with the filler, beating up the filler and pile loops against the previously formed fabric held in frictional engagement with said fingers, and successively varying the position of the variant-height portions of certain of said fingers, at the shogging zone, relative to the variant-height portions of other of said fingers in the course of forming successive loops to thereby vary the length of successive loops drawn over the variant-height portions.

34. A method of weaving pile fabrics on a loom having movable beating means which comprises weaving warp and filler yarns into a base fabric and concurrently with the weaving of the base fabric interweaving pile yarn into the fabric by shogging strands of pile yarn over warpwise extending fingers, wherein said fingers have upper surface portions at their free ends of variant height, threading the strands of pile yarns between the fingers and entirely forwardly of the beating means into the shed of the loom below the path of the filler inserting means, inserting filler strands over the pile yarn and through the open shedded warp, again threading the pile yarn upwardly between the fingers, thereby looping the pile yarn around the filler, keeping the pile yarn under tension whereby the loops thus formed are drawn snugly around the fingers with the filler, beating up the filler and pile loops against the previously formed fabric held in frictional engagement with said fingers, and successively and selectively varying the position of the variant-height portions of said fingers in the course of forming successive loops to thereby vary the length of the loops drawn over the variant-height portions.

35. In a method of weaving pile fabrics on a loom having movable beating means and wherein warp yarns and filler yarns are woven into a base fabric concurrently with which pile yarns are interwoven with said base fabric; the steps of positioning variant-height portions of a plurality of warpwise extending fingers between pile yarns and the base fabric, shogging said pile yarns over the fingers to form pile loops of different lengths, shifting said fingers warpwise to position other portions of a different height than the first-named portions of said fingers between the corresponding pile yarns and the base fabric, and shogging pile yarns over said fingers to form warpwise rows of pile loops in each row of which some of the loops are longer than others.

36. In a method of making pile fabrics on a loom having movable beating means and wherein warp yarns and filler yarns are woven into a base fabric concurrently with which pile yarns are interwoven with said base fabric; the steps of positioning variant-height portions of a plurality of warpwise fingers between the pile yarns and the base fabric while shogging said pile yarns over the fingers to form pile loops of different lengths, thereafter shifting said fingers warpwise to position other portions of a different height than the first-named portions of said fingers between the corresponding pile yarns and the base fabric, shogging the pile yarns over said fingers to form warpwise rows of pile loops in each row of which some of the loops are longer than others, and thereafter shearing the tops off the longer loops to form cut pile areas between adjacent relatively short-loop areas.

37. In a loom for weaving pile fabrics having means for weaving a base fabric, warpwise extending pile wires disposed adjacent the fell of the fabric being woven, means for concurrently forming pile loops over said wires and attaching the loops to the base fabric, said wires having upper surface portions of different heights, means for shifting said wires warpwise to vary the position of said portions for varying the length of successive groups of loops as the fabric is woven, and means for automatically severing said loops subsequent to the formation thereof and concurrent with the formation of succeeding loops.

38. In a loom for weaving pile fabrics having means for weaving a base fabric, warpwise extending pile wires disposed adjacent the fell of the fabric being woven, means for concurrently forming pile loops over said wires and attaching the loops to the base fabric, said wires having upper surface portions of different heights, means for shifting said wires warpwise to vary the position of said portions for varying the length of successive groups of loops as the fabric is woven, and means for automatically severing at least some of said loops subsequent to the formation thereof and concurrent with the formation of succeeding loops.

39. In a loom for weaving pile fabrics having means for weaving a base fabric, warpwise extending pile wires mounted on the loom adjacent the fell of the fabric being woven, said wires having high and low upper surface portions thereon, means for concurrently forming pile loops of a given length over the high portions of said wires in warpwise spaced portions of the base fabric and attaching the loops to the base fabric, means to shift said wires warpwise for forming relatively short pile loops over the low portions of the wires and attaching the loops to other portions of the base fabric between said spaced portions concurrent with the weaving of said base fabric, and means automatically operable concurrent with the weaving of the base fabric for severing the loops thus formed.

40. In a loom for weaving pile fabrics having means for weaving a base fabric, warpwise extending pile wires mounted on the loom adjacent the fell of the fabric being woven, said wires having high and low upper surface portions thereon, means for concurrently forming pile loops of a given length over the high portions of said wires in warpwise spaced portions of the base fabric and attaching the loops to the base fabric, means to shift said wires warpwise for forming relatively short loops over the low portions of the wires and attaching the loops to other portions of the base fabric between said spaced portions concurrent with the weaving of said base fabric, and means automatically operable concurrent with the weaving of the base fabric for severing said loops of a given length only.

41. In a loom for weaving pile fabrics having means for weaving a base fabric, warpwise extending pile wires mounted on the loom adjacent the fell of the fabric being woven, said wires having high and low upper surface portions thereon, means for concurrently forming pile loops of a given length over the high portions of said wires and in warpwise spaced portions of the base fabric and attaching the loops to the base fabric, means to shift said wires warpwise for forming relatively short loops over the low portions of the wires and attaching the loops to other portions of the base fabric between said spaced portions concurrent with the weaving of said base fabric, and means automatically operable concurrent with the weaving of the base fabric for severing only said relatively short loops thus formed.

42. In a loom for weaving pile fabrics having means for weaving a base fabric, means for concurrently forming adjacent warpwise pile loop areas from pile yarns wherein each area is formed with warpwise spaced portions having relatively long pile loops with intervening portions having relatively short pile loops, said last-named means including warpwise extending pile wires provided with high and low upper surface portions, means to shog pile yarns across and above the base fabric, means to selectively shift said wires warpwise to selectively position said high and low portions beneath the shogging means, said shogging means being operable to attach the long and short pile loops to the base fabric, and means concurrent with the weaving of the base fabric for automatically severing the loops thus formed in at least one of said warpwise areas independently of the loops formed in at least one other of said areas.

43. In a loom for weaving pile fabrics having means for weaving a base fabric, means for concurrently forming adjacent warpwise pile loop areas from pile yarns wherein each area is formed with warpwise spaced portions having relatively long pile loops with intervening portions having relatively short pile loops, said last-named means including warpwise extending pile wires provided with high and low upper surface portions, means to shog pile yarns across and above the base fabric, means to selectively shift said wires warpwise to selectively position said high and low portions beneath the shogging means, said shogging means being operable to attach the long and short pile loops to the base fabric, and means concurrent with the weaving of the base fabric for automatically severing the long loops only thus formed in at least one of said warpwise areas independently of the short loops and independently of the loops in at least one other of said areas.

44. In a loom for weaving pile fabrics having means for weaving a base fabric, means for concurrently forming adjacent warpwise pile loop areas from pile yarns wherein each area is formed with warpwise spaced portions having relatively long pile loops with intervening portions having relatively short pile loops, said last-named means including warpwise extending pile wires provided with high and low upper surface portions, means to shog pile yarns across and above the base fabric, means to selectively shift said wires warpwise to selectively position said high and low portions beneath the shogging means, said shogging means being operable to attach the long and short pile loops to the base fabric, and means concurrent with the weaving of the base fabric for automatically severing the short loops only thus formed in at least one of said warpwise areas independently of the long loops and independently of the loops in at least one other of said areas.

45. In a method of weaving pile fabrics on a loom wherein a base fabric is woven from warp and filler yarns and pile yarns are interwoven into the base fabric by shogging pile yarns over warp yarns and warpwise extending fingers having loop forming portions of different heights, the steps of longitudinally shifting said fingers warpwise adjacent the fell of the base fabric and in a plane above the base fabric and beneath the pile yarns being shogged in the course of continuous weaving to thereby vary the length of successive loops formed from the pile yarns over said warp yarns in accordance with the position of the fingers, 46. In a loom for weaving pile fabrics, said loom having means for making a base fabric including a reed and additional means for forming loops from pile yarns over longitudinal loop forming fingers; the combination therewith of a series of spaced warpwise extending loop forming fingers mounted on the loom and disposed adjacent the fell of the fabric being woven, said fingers being provided with loop forming portions of different heights, and means for selectively shifting the fingers warpwise to vary the position of said fingers within and without the point at which loops are formed in order to provide surfaces over which loops may be formed to achieve a predetermined pattern in relief in the fabric being woven.

References Cited in the file of this patent

UNITED STATES PATENTS

| | | |
|---|---|---|
| 2,270,103 | Baynton | Jan. 13, 1942 |
| 2,318,080 | Keen | May 4, 1943 |
| 2,430,559 | Dacey | Nov. 11, 1947 |
| 2,437,378 | Clark | Mar. 9, 1948 |
| 2,655,951 | Clark | Oct. 20, 1953 |
| 2,674,270 | Smiley | Apr. 6, 1954 |
| 2,695,634 | Miller et al. | Nov. 30, 1954 |
| 2,713,877 | Jackson | July 26, 1955 |
| 2,715,917 | Smiley | Aug. 23, 1955 |

FOREIGN PATENTS

| | | |
|---|---|---|
| 36,870 | Germany | Sept. 16, 1886 |